US012693204B2

(12) United States Patent　　　(10) Patent No.:　US 12,693,204 B2
　　Alsheimer et al.　　　　　　　(45) Date of Patent:　　Jul. 28, 2026

(54) METHOD AND DEVICE FOR OPTICALLY RECOGNIZING A DISCRETE ENTITY FROM A PLURALITY OF DISCRETE ENTITIES

(71) Applicant: LEICA MICROSYSTEMS CMS GMBH, Wetzlar (DE)

(72) Inventors: Soeren Alsheimer, Wetzlar (DE); Joachim Bradl, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 214 days.

(21) Appl. No.: 18/284,302

(22) PCT Filed: May 4, 2021

(86) PCT No.: PCT/EP2021/061754
§ 371 (c)(1),
(2) Date: Sep. 27, 2023

(87) PCT Pub. No.: WO2022/207125
PCT Pub. Date: Oct. 6, 2022

(65) Prior Publication Data
US 2024/0159647 A1　　May 16, 2024

(51) Int. Cl.
*G01N 15/1429*　　(2024.01)
*G01N 15/14*　　(2006.01)
(Continued)

(52) U.S. Cl.
CPC ....... *G01N 15/1429* (2013.01); *G01N 15/147* (2013.01); *G06V 20/693* (2022.01);
(Continued)

(58) Field of Classification Search
CPC .... G06V 10/426; G06V 20/698; G06V 20/69; G01N 15/1433; G01N 15/1429
See application file for complete search history.

(56) References Cited

U.S. PATENT DOCUMENTS

2015/0253237 A1* 9/2015 Castellarnau .... G01N 35/00732
506/37
2019/0247852 A1* 8/2019 Lee ................... B01L 3/502761
(Continued)

FOREIGN PATENT DOCUMENTS

WO　　WO 2020/232072 A1　11/2020

OTHER PUBLICATIONS

Duncombe Todd A and Petra S Dittrich, "Droplet barcoding: tracking mobile micro-reactors for high-throughput biology", Jun. 12, 2019 (Jun. 12, 2019), Current Opinion in Biotechnology, vol. 60, pp. 205-212, XP085930991, Elsevier, Netherlands.
(Continued)

*Primary Examiner* — Yuzhen Shen
(74) *Attorney, Agent, or Firm* — LEYDIG, VOIT & MAYER, LTD.

(57) ABSTRACT

A method for optically recognizing at least one target discrete entity from a plurality of discrete entities includes acquiring a first optical read-out of a marker of a first discrete entity that defines the target discrete entity, generating a first set of representations of the marker of the first discrete entity based on the first optical read-out, associating the first set of representations with the target discrete entity, acquiring a second optical read-out of a marker of at least one discrete entity from the plurality of discrete entities, generating a second set of representations of the marker of the at least one discrete entity based on the second optical read-out, comparing the second set of representations to the first set of representations, and recognizing the at least one discrete entity as the target discrete entity upon determining that the second set of representations matches the first set of representations.

17 Claims, 30 Drawing Sheets

(51) Int. Cl.
    *G06V 20/69*         (2022.01)
    *G01N 15/10*         (2006.01)

(52) U.S. Cl.
    CPC .......... *G06V 20/695* (2022.01); *G06V 20/698*
        (2022.01); *G01N 2015/1006* (2013.01); *G01N*
            *2015/1493* (2013.01); *G01N 2015/1497*
                           (2013.01)

(56)               References Cited

U.S. PATENT DOCUMENTS

| | | | |
|---|---|---|---|
| 2020/0115703 A1 | 4/2020 | Bharadwaj et al. | |
| 2022/0106623 A1* | 4/2022 | Bielas .................... | C12Q 1/686 |

OTHER PUBLICATIONS

Björn Harink et al, "An open-source software analysis package for Microspheres with Ratiometric Barcode Lanthanide Encoding (MRBLEs)", PLOS ONE, vol. 14, No. 3, Mar. 22, 2019 (Mar. 22, 2019), pp. 1-20, XP055763772, US.

Omar Lopez-Rincon et al, "Binary Large Object-Based Approach for QR Code Detection in Uncontrolled Environments", Journal of Electrical and Computer Engineering, vol. 2017, Jan. 1, 2017 (Jan. 1, 2017), pp. 1-15, XP055771384, Hindawi, UK.

Yunhua Gu and Weixiang Zhang, "QR code recognition based on image processing", International Conference on Information Science and Technology (ICIST), 2011, IEEE, Mar. 26, 2011 (Mar. 26, 2011), pp. 733-736, XP031865333, China.

Gungun Lin et al, "The Quest for Optical Multiplexing in Bio-discoveries", Chem, vol. 4, No. 5, May 1, 2018 (May 1, 2018), pp. 997-1021, XP055731604, CellPress, US.

* cited by examiner

100

104

102

| | |
|---|---|
| Start | S2300 |
| Feature extraction and feature classification | S2302 |
| Representation generation | S2304 |
| End | S2306 |

3000

3010

3020

METHOD AND DEVICE FOR OPTICALLY RECOGNIZING A DISCRETE ENTITY FROM A PLURALITY OF DISCRETE ENTITIES

CROSS REFERENCE TO RELATED APPLICATIONS

This application is a U.S. National Phase application under 35 U.S.C. § 371 of International Application No. PCT/EP2021/061754, filed on May 4, 2021, and claims benefit to International Patent Application No. PCT/EP2021/058785, filed on Apr. 1, 2021. The PCT/EP2021/061754 Application was published in English on Oct. 6, 2022 as WO 2022/207125 A1 under PCT Article 21(2).

FIELD

Embodiments of the present invention relate to a method and a device for optically recognizing a discrete entity from a plurality of discrete entities in a liquid, each discrete entity comprising a biological sample and a marker.

BACKGROUND

Rare cells, like e.g. adult stem cells, circulating tumour cells and reactive immune cells (e.g. T-Cells, B-Cells, or NK-cells reactive to a certain antigen), are of great interest to basic and translational researchers. Reactive immune cells such as B-cell clones for instance that react to a certain pathogen, e.g. a virus, and can produce antibodies against a particular pathogen are of great value to generate urgently needed therapeutic antibodies. Similarly, reactive T-cells are sought after in the context of personalised medicine and the treatment of cancer and other diseases. Once a reactive T-cell is identified and isolated, the genetic sequence encoding the corresponding T-cell receptor displaying affinity against the target antigen can be cloned and used to generate genetically engineered T-cells such as CAR-T cells. Similarly, circulating tumour cells are expected to have great value for diagnosing cancer, predicting outcomes, managing therapies, and for the discovery of new cancer drugs and cell-based therapeutics. Suspensions of cells containing rare cells are typically derived from either a tissue sample by means of dissociation or from a liquid biopsy. The identification, analysis, and isolation of rare cells in these samples, the analysis of these cells on the single cell level (single cell analysis, SCA) is therefore of great value for basic and translational research, diagnostic and therapeutic applications as well as in the context of bioprocessing and development and manufacturing of biologics and cellular therapeutics.

As the ability to identify and differentiate diverse cell types expands, the identification of cell types becomes more granular, i.e. the rare cell populations of interest are smaller and better defined. Thus, in order to find rare cells of interest a high (<100k), very high (<1M), or ultra-high (>1M) number of cells typically needs to be analysed.

Recent progress in the fields of cell culture research has led to the advent of 3D cell culture, which is based on cultivating cells in three dimensions, for example, in suspension culture (scaffold-free techniques) or embedded in hydrogels and/or extracellular matrices (scaffold-based techniques). Hydrogels and extracellular matrices have been used extensively in conjunction with other elements for scaffold-based 3D cell culture. Cells and other elements can be efficiently embedded into discrete entities such as hydrogel beads by various means, cultivated in suspension, and imaged. Various forms of hydrogel beads including single-phase, multi-phase, mixed phase, hollow as well as solid core hydrogel beads with or without a shell can be manufactured using a variety of approaches including microfluidics, 3D printing, emulsification or electro-spraying. This allows cultivation of large numbers of cells, including rare cells, for analytical, diagnostic and therapeutic purposes in a 3D cell culture.

The document WO 2020/232072 A1 discloses a method to generate entities comprising cells by means of a microfluidic system. The document US 2020/0115703 A1 discloses a method to sort entities, for example, comprising cells, by means of a microfluidic system.

The cultivation of cells embedded in hydrogels (i.e. scaffold-based cell culture), which are kept in suspension, combines the benefits of scaffold-based cell culture with the benefits of suspension cell culture and is thus an attractive mode of cell culture for a wide range of applications. For many workflows that could be based on this type of cell culture, it would need to be able to repeatably recognize individual discrete entities. For example, in case of handling a large number of single cells, including rare cells, in a collective 3D cell culture, it is of great interest to be able to follow individual entities or cells, for example, over the course of an experiment. This allows identification, analysis, and isolation especially of rare cells within the large number of cells. However, handling large numbers of entities and cells in a single vessel, whilst keeping track of each, is currently not possible.

SUMMARY

Embodiments of the present invention provide a method for optically recognizing at least one target discrete entity from a plurality of discrete entities in a liquid. Each discrete entity includes a biological sample and a marker. The method includes acquiring a first optical read-out of the marker of a first discrete entity from the plurality of discrete entities. The first discrete entity defines the target discrete entity. The method further includes generating a first set of representations of the marker of the first discrete entity based on the first optical read-out of the marker of the first discrete entity, and associating the first set of representations with the target discrete entity, acquiring a second optical read-out of the marker of at least one discrete entity from the plurality of discrete entities, generating a second set of representations of the marker of the at least one discrete entity based on the second optical read-out of the marker of the at least one discrete entity, comparing the second set of representations to the first set of representations, and recognizing the at least one discrete entity of the second optical read-out as the target discrete entity, upon determining that the second set of representations matches the first set of representations.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
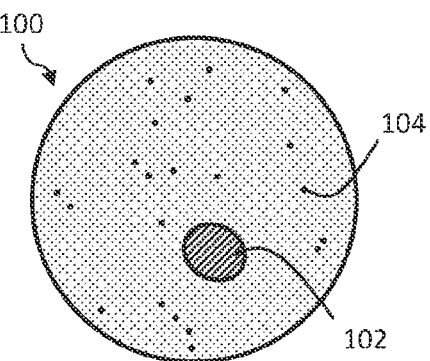
FIG. 1 shows a schematic view of a hydrogel bead according to some embodiments.

Embodiments of the present invention provide a method and a device for optically recognizing at least one target discrete entity from a plurality of discrete entities that enables repeated identification of at least the target discrete entity from the plurality of discrete entities.

A method is provided for optically recognizing at least one target discrete entity from a plurality of discrete entities in a liquid, each discrete entity comprising a biological sample and a marker. The method comprises the following steps: acquiring a first optical read-out of the marker of at least one discrete entity from the plurality of discrete entities, said discrete entity defining the target discrete entity; generating a first set of representations of the marker based on the first optical read-out of the marker of the target discrete entity and associating the first set of representations with the target discrete entity; acquiring a second optical read-out of the marker of at least one discrete entity from the plurality of discrete entities; generating a second set of representations of the marker based on the second optical read-out of the marker of the discrete entity; comparing the second set of representations to the first set of representations; recognizing the discrete entity of the second optical read-out as the target discrete entity, when the second set of representations matches the first set of representations, in particular based on a measure of similarity and a statistical confidence score. The method enables, amongst others, a fast and reliable identification or recognition of individual discrete entities in a large number of pooled discrete entities.

Alternatively or additionally, a method is provided for optically identifying at least one target discrete entity from a plurality of discrete entities in a liquid, each discrete entity comprising a biological sample and a marker. The method comprises the following steps: acquiring a first optical read-out of the marker of at least one discrete entity from the plurality of discrete entities; generating a set of representations of the marker based on the first optical read-out of the marker of the discrete entity and associating the first set of representations with the discrete entity. The method steps for identifying at least one target discrete entity from a plurality of discrete entities are suitable to be combined with any other of the method steps and/or of the features as described in this document or in any document to which reference is made.

The expression "recognize a discrete entity" in the sense of the present document can be understood as at least one of to identify a discrete entity and to retrieve a discrete entity. The discrete entity can also be named an object and is, for example, a hydrogel bead. The discrete entities are at least partially immersed in the liquid, in particular, they are suspended in that liquid. The marker of each discrete entity is an optically detectable pattern, structure and/or distribution, that can be read-out by means of a microscope, for example.

The optical read-out is, for example, an image or a digital image. When the optical read-out is acquired, image data is acquired. There may be further discrete entities in the same vessel or in an ensemble as the plurality of discrete entities. When this document refers to "each" discrete entity, the discrete entities do not need to have all the claimed features. In case the further entities comprise no marker, they are not identified or recognized by means of the method.

A set of representations in the sense of this document contains at least one representation. Depending on the number of discrete entities, which need to be identified and the user requirements with respect to speed of, robustness of, and statistical confidence in the recognition as the target discrete entity, it may be beneficial to compare multiple first representations of the first set of representations with multiple second representations of the second set of representations for each discrete entity. In the sense of this document comparing representations refers to comparing "equivalent representations". In the sense of this document "equivalent representations" are representations that have been generated using the same method and criteria or parameters. This means that for example a first set of representations is compared with a second set of representations in a way that pairs of equivalent representations are compared to each other. In particular multiple pairs of equivalent representations may be compared to each other in a sequential or stepwise fashion (alternatively: in parallel or simultaneously) starting with the comparison of representations that have a lower information content and proceeding to representations that have a higher information content. This allows a user to adjust the computational load of generating, storing, accessing, and comparing sets of representations to the requirements of the user in relation to an experiment, i.e. all discrete entities in a given set, or in relation to a subset of discrete entities of interest. Further it allows balancing computational load, speed of recognition and statistical confidence in the recognition. This balancing can also be changed during the course of an experiment as the representation generation and matching criteria and/or parameters can be dynamically adjusted, i.e. the number of elements in the sets of representations and their information content can be adjusted "on-the-fly". Likewise, it is possible to extend the set of representations dynamically with further representations on demand, to resolve unclear results from the matching and/or improve the statistical confidence in a particular match. The corresponding calculations can be performed online or independently, i.e. during the course of the experiment, or offline, after the experiment.

This is relevant as some of the discrete entities and biological samples they contain might be of higher interest to the user, for example rare reactive immune cells. In order to match a pair of sets of representations it is sufficient that a subset of the respective representations they contain yields a match in the sense of this document, i.e. representations are progressively compared to each other until a match is found based on a similarity measure and required statistical confidence score or can be confidently rejected. This means that it may not be needed to compare all representations in a pair of sets of representations to find a match.

The method enables workflows using scaffold-based suspension 3D cell culture, in which the state of a sample is compared between several time-points, for example before and after a treatment with a chemical compound, a biologic compound (e.g., a protein, a signalling molecule, a nucleic acid, an antigen, a neoantigen, an antibody), a pathogen (e.g., a virus, a bacterium, a parasite), a biologically active agent (e.g. CRISPR, RNAi), a mechanical, electrical, or photophysical stimulus. The state of a sample can be captured by imaging the sample, for example, at the same time as the optical read-out, in particular the optical read-out includes imaging the sample.

Further the method enables running time-lapse experiments with single cells, groups of cells, co-cultures, spheroids, tumoroids, or organoids using scaffold-based suspension 3D cell culture. Likewise, a variety of cell-based assays which are commonly used in phenotypic screening can be performed using scaffold-based suspension 3D cell culture while taking advantage of ultra-high throughput analysis that is possible as the format lends itself well to flow-through imaging and sorting. Such cell-based assays include cell viability assays, cell proliferation assays, cytotoxicity assays, cell senescence assays, and cell death assays. Cells or groups of cells that have been identified in this way, can be sorted and/or subject to at least one downstream process. These downstream processes may include at least one of retrieval of the biological sample from the discrete entity, further cultivation and expansion, biologics production, bioprocessing, fermentation, cloning of genes, and downstream analysis. Downstream analysis may include the genomic, transcriptomic, proteomic profiling, the analysis of transcription factor binding e.g. ChIP-Seq., DNA methylation profiling, metabolome analysis, amongst others.

In a preferred embodiment, some discrete entities or each discrete entity is comprised of polymeric compounds. This polymeric compound can be polymerised to form the discrete entity. This enables culturing of the cells in the discrete entity in scaffoldbased suspension 3D cell culture, which combines the benefits of 3D suspension cell culture and scaffold-based cell culture. It provides a way to leverage key benefits of 3D suspension cell culture including the improvement of mixing and aeration by use of agitated vessels, such as rotating bioreactors, spinner flasks, stirred tanks or rocking bed bioreactors, the possibility of running a continuous medium exchange, and the possibility to perform inline process control, while growing samples in a scaffold, i.e., a hydrogel and/or extracellular matrix and/or basement membrane, which provides a much more physiologically relevant environment for the samples with respect to matrix elasticity, chemical composition, attachment sites, and para- and autocrine signalling.

A set of representations of the marker and possibly also from the discrete entity and/or from the biological sample might be generated from the image data (image data level) obtained after image acquisition of an optical read-out either directly or indirectly involving a feature extraction step. Feature extraction is typically performed by feeding n-dimensional image data of an optical read-out of a discrete entity through a suitable image processing pipeline or algorithm. Such an image processing pipeline may include background removal, compression, filtering, denoising, enhancement, reconstruction, correction, deconvolution, multi-view deconvolution, multi-view registration, multi-view fusion, as well as other tools well known to someone skilled in the art of digital image processing and typically include an image segmentation step, which generates a set of segmented objects that may also be named features, as well as a feature classification step. For many of the afore mentioned image processing tools classical software algorithms and (modern) machine/deep learning or AI-based algorithms exist. In particular for pixel classification, image denoising, deconvolution, enhancement, segmentation, and classification of segmented objects/features machine/deep learning or AI-based algorithms exist and are known to provide superior performance to most classical algorithms.

Preferably, each set of representations (representation level) is generated indirectly based on a subset of features (feature level), i.e. the marker but might also include the consideration of the discrete entity and/or of the biological sample, that is obtained through feature extraction and/or feature classification of an respective optical readout. In particular, the features relate to constituent parts of the marker.

It might be advantageous to perform image analysis, image improvement and/or image deconvolution of the images generated by an optical read-out. In particular, this might consider the fact that the discrete entities usually have a spherical or spheroid shape and depending on the parameters of the optical read-out/imaging system, corrections might be applied e.g. because not the complete discrete entity can be captured by acquiring one single image of the discrete entity if the size of the discrete entity is larger than the depth of focus of the imaging optics and parts of the discrete entity are imaged as defocused or blurred components. This enables the reliable identification of the marker and generation of the set of representations. However, defocused or blurred components can be further analysed and additional information about such components might be obtained e.g. based on the knowledge of the characteristics of the imaging system performing the optical read-out, such as PSF (point spread function), OTF (optical transfer function), MTF (modulation transfer function) and/or known parameters of the marker/constituent parts of the marker.

It can be preferable, that feature extraction and feature classification analysis for marker generation are performed leveraging machine and deep learning approaches, such as for example content aware feature enhancement. This is especially advantageous when the marker is generated using fluorescent microbeads, fluorescent nanorulers or similar structures as this allows neural networks to be pretrained to perform content aware feature enhancement specifically for these features. Likewise, in this case substantial pre-training can be easily performed against a ground truth, i.e. image data from the hydrogel beads containing only the marker. The ground truth can be generated on a different imaging system. In particular the ground truth can be generated on an imaging system that has a high optical performance with respect to e.g. numerical aperture, resolution, lightcollecting efficiency, Etendue (flux), signal-to-noise, chromatic or spherical aberrations as well as any other imaging aberration. The method can be implemented in a way that each run generates respective training data that potentially improves the quality of the generated image data by improving for example denoising, background removal, image correction, deconvolution, amongst others as well as the performance of feature extraction. Similarly, networks can be pre-trained using suitable reference samples to classify features. In particular networks can be pre-trained to classify a feature as the hydrogel bead, a fluorescent microbead, a fluorescent nanoruler, or similar, and a cell, a group of cells, or a different kind of biological sample.

The result of feature extraction is a set of features that typically includes at least one of a segmented virtual hydrogel bead/discrete entity and its centre of mass, which is used as a 3-dimensional reference, and the segmented features of the marker as well as segmented features belonging to the biological sample. Feature classification algorithms based on classical approaches, e.g. filtering for size, colour, shape, etc., as well as machine or deep learning based approaches may be used to reliably classify features into one of the aforementioned categories, i.e. as belonging to the discrete entity or hydrogel bead, the marker, or the biological sample. The segmented features of the marker can comprise at least one of image data resulting from an optical readout (e.g. before and/or after image segmentation), information about the marker and information of at least one constituent part of the marker, e.g. number of marker constituents, vector based-, graph based-, spatial and/or frequency information about the marker. Based on the set of features a set of representations of the marker is generated containing at least one representation of the marker. One, some or all of the items of a set of representations mentioned above might be stored in a suitable format being suitable to perform a search of some or all stored representations of markers of the optically read-out discrete entities, such that it is e.g. possible to perform a search by the number of marker constituents. Alternatively, only lower information content representations may be stored and higher information content representations may be generated on demand to balance computational load, speed of matching, robustness and statistical confidence in the recognition with the requirements of the user.

In a further preferred embodiment, some markers are or each marker is generated during formation of the respective discrete entity. This could be done e.g. by adding fluorescent microbeads, fluorescent nanorulers, or similar structures in a suitable concentration in a liquid during the process of the generation of the discrete entities. This enables the marker or part of the marker to be generated during the formation of the discrete entity.

In a further preferred embodiment, some markers comprise or each marker comprises at least one of a luminescent (fluorescent or phosphorescent) microbead, a nonfluorescent microbead, a luminescent (fluorescent or phosphorescent) nanoruler, and a dye. If the marker comprises fluorescent or non-fluorescent microbeads, it is possible to use different kinds of microbeads, these different kinds of microbeads can include microbeads of different sizes (diameters), different shapes, different (fluorescent) emission characteristics, such as different excitation spectra, different emission spectra or different fluorescent lifetimes. The marker may extend in three dimensions and could e.g. be at least one of distributed on the surface of the discrete entity, in the material of the discrete entity, inside the discrete entity or in the biological sample. This enables fast, non-destructive and contactless detection of the marker. For example, fluorescent microbeads, fluorescent nanorulers, and similar structures can be easily read-out even at very high acquisition speeds and lend themselves well for segmentation or feature extraction and can be easily removed from the image data virtually by means of filtering. This is advantageous as the marker might otherwise obstruct the view on the included biological specimen.

Depending on the specific experimental situation and user requirements in terms of total number of discrete entities under investigation, the speed, robustness, and reliability of recognition of the same, the user may choose to endow the discrete entities with more information that can be used to generate a marker by means of adding constituents during the formation or by means of generating patterns or distributions during or after the formation of the discrete entity.

The marker might alternatively or additionally comprise a pattern, structure or distribution which can be optically read out by means of detecting phase and/or frequency and/or polarization and/or amplitude of light coming from the discrete entity, in particular from the marker. Such detected light might represent information from the marker and might be used for identifying the respective discrete entity. For example, the surface of the discrete entities itself might comprise a unique surface structure—comparable to a moon landscape—which might be regarded as the marker. Such a structure might be optically read out or imaged e.g. by an imaging device like a microscope being operated in phase and/or interference contrast. Furthermore, the discrete entity could be treated in a manner such that the treatment results in a marker or in a part of the marker. An example for such a treatment is laser ablation or laser microdissection or printing. Furthermore, alternatively or additionally the discrete entity might comprise light absorbing substances or coloured substances which comprise a structure or distribution such that this might be regarded at least partially as a marker.

In an embodiment, the marker can comprise a mixture of different fluorochromes and/or dyes and the discrete entities might be marked with such markers in a way that each discrete entity comprises a different mixture of different fluorochromes and/or dyes. Such a kind of marker could optically be read out with a suitable optical setup comprising a spectrometer and the result of the analysis of spectrometer information about the light coming from the discrete entity representing the spectral composition of the mixture of fluorochromes and/or dyes (e.g. resulting in a point or a small region in the RGB or CMYK or any other suitable colour space) might be used as information of the set of representations of the marker.

An optical read-out of the marker usually requires a suitable illumination of the discrete entity, for instance, when performing an optical read-out of a marker comprising fluorescent microbeads, the illumination is performed with illumination light being suitable to excite the fluorescence of the microbeads.

In a particular embodiment, some markers are or each marker is generated by means of lithography, in particular by photolithography, 2-photon lithography, or multiphoton lithography. The marker or part of the marker could be generated after the discrete entity is formed. Using multiphoton lithography 3-dimensional patterns can be generated comparable to stacked barcodes. Such codes can hold a significantly higher information content as compared to 2-dimensional codes and allow a large number of unique codes to be generated. They may also enable the storage of additional information relating to the sample origin, the experiment, and/or user in the code and therefore directly in the discrete entity. Note that such codes are substantially stable over a long period of time and may provide significant advantages not only in the context of the workflow according to embodiments of the present invention, but also may prove very valuable for banking of biological samples.

In an embodiment, each marker comprises at least one element, which has a directional component. In particular, the directional component may be an object with a single central axis, such as a longitudinal axis, and with the orientation of the object identifiable by the single central axis. The object may be a nanoruler or an elongated microbead, having a single longitudinal axis and with the longitudinal axis being determinable to determine the orientation of the object.

In a particular embodiment, each biological sample comprises at least one cell. This enables the identification and analysis especially of rare cells as well as their sorting and downstream analysis and/or downstream cultivation and/or downstream use. Rare cells in the context of this document may refer to reactive immune cells, stem cells, circulating tumor cells, and other rare cell populations of interest. Such populations are typically identified based on the expression of certain genes, which is typically assessed on the protein and/or RNA level. In the following it is referred to these genes as biomarkers. A reliable identification of a cell type, in particular a rare cell type, typically requires the readout of a number of biomarkers. If not only the cell type, but also the state of the cell needs to be identified a higher number of biomarkers needs to be read out. The ability to identify T-cells or B-cells that are reactive against a certain antigen in particular a tumor neoantigen or antigens of viral or bacterial origin might be of great importance. As reactive immune cells are very rare their identification and isolation for further expansion in culture for bioprocessing applications and biologics production, development of cellular therapeutics, and cloning of their T- or B-cell receptors for the development of CAR-T cells and similar cellular therapeutics for example is a time-consuming and inefficient process with currently available methods. Using the workflow disclosed in this document, which lends itself well for ultra-high throughput analysis using the flow-through based imaging and sorting device disclosed in this document, a large number of immune cells can be analysed with a variety of assays. These assays include but are not limited to secretome and cytokine profiling. Cytokines are relevant in this context as they allow conclusions about the activation status, i.e. the reactivity of a T-cell or B10731-cell to be drawn. Note that these cytokine or secretome profiling assays may be live cell compatible such that the identified reactive immune cells, which may be T-cell, B-cells, and/or NK-cells can be isolated, retrieved from the discrete entity and put into a suitable downstream cultivation vessel, like for example a spinner flask or a microplate.

Further circulating tumor cells are rare cells that are of great biomedical interest as their analysis can help predict clinical outcomes and therefore support clinical decision making. The ability to identify, isolate, cultivate, these cells is therefore of great importance. With respect to circulating tumor cells the scaffold-based suspension 3D cell culture and the repeated analysis e.g. time-lapse imaging described in this document is advantageous as it allows the behaviour, morphology, cell division, motility, viability etc. of these cells to be studied on the single cell level. Studies on the single cell level are advantageous as they allow subtle phenotypes to be uncovered, which would otherwise be lost in population averages. Such phenotypes may include differences in the sensitivity of different circulating tumor cells to chemotherapeutic drugs, biologics, or other agents for example. The disclosed method and device are also advantageous to perform cell killing assays with circulating tumor cells or tumor cells, that are derived from biopsies either from fresh biopsies or from biobanks where tumor cell lines and tumoroid models are banked.

Further rare cells that are of great significance in terms of cancer research and therapy are cancer stem cells as the growth of most tumors seems to be fuelled by cells that exhibit stem cell-like properties. These cells have been termed cancer stem cells and they may share a close relationship to adult stem cells, which have been identified in almost all human organs, where they form the basis of physiological tissue homeostasis. In cancer therapy it is not uncommon to observe substantial reductions in tumor burden, i.e. the number and size of tumors that can be visualized by for instance diagnostic imaging, as a result of treatment, in some of these cases however tumors reappear. Cancer stem cells, i.e. a small fraction of tumor cells, are suspected to exhibit higher resistance to therapy and to be responsible for this re-growth. These cells are therefore of considerable biomedical interest, and embodiments of the present invention can provide significant advantageous for their study over currently available methods. In particular the scaffold-based 3D suspension culture of a large number of tumor cells derived from a liquid biopsy (i.e. circulating tumor cells), cells derived from a biopsys of the tumor, or a biobanked tumoroid model for example can be analysed in groups or on the single cell level using a plethora of cell-based assays. These include in particular, clonal analysis of cell division patterns which is a powerful tool to investigate stem cell properties, cell viability assays, cell proliferation assays, cytotoxicity assays, cell senescence assays, cell death assays.

Further (adult) stem cells are rare cells, which are of great relevance as they form the basis of proper development, tissue homeostasis and repair. Embodiments of the present invention provide numerous advantageous to the study of stem cells over prior art. In particular it allows a large number of stem cells and their progeny to be followed over time on the single level using clonal analysis strategies. Clonal analysis is a powerful tool to decipher heterogeneity in stem cell populations which may also be referred to as stem cell compartments and that are typical delineated using a limited set of biomarkers. For most stem cell populations biomarker sets that are currently available do not clearly identify the actual stem cell population but rather a heterogeneous mix of stem cells and already committed progenitor cells. Embodiments of the present invention can be used in conjunction with existing clonal analysis strategies to study large numbers of stem cells over time with imaging assays and then subject them to downstream analysis.

In particular, each optical read-out comprises at least one of a single image, a stack of images, and a time series of images. The stack of images captures at least the marker of the discrete entity. This enables capturing a part of the marker or the capturing of the entire marker. Further, the optical read-out might comprise at least single images, a plurality of images (e.g. acquired simultaneously with at least two or more imaging systems or detectors, in particular capturing the same discrete entity from different perspectives), a time series of images, different views or perspectives of the discrete entity, and a set of three-dimensional stacks of images of the discrete entity imaged from multiple angles or perspectives or views. This allows the registration, fusion, and/or deconvolution of multiple views into a single image dataset of improved image resolution.

It can be preferable, that each set of representations is generated based on spatial and/or physical characteristics of the respective marker or a part of that marker. For example, spatial characteristics can be the spatial distribution, pattern or structure of microbeads in and/or on the surface of a discrete entity. This makes it possible to have a large number of unique markers and respective sets of representations.

Preferably, some sets of representations or each set of representations is generated in the spatial domain. In particular, image data being generated from an optical readout might be the basis for generating a set of representations of the marker for the discrete entity being read out. This enables the easy and robust generation of the set of representations.

Preferably, each set of representations is generated in the frequency domain. This typically requires a suitable transformation of the acquired image data of an optical read out to the frequency domain. Thereafter, a set of representations of the marker is generated. This enables the easy and robust generation of the set of representations.

In a preferred embodiment, each set of representations contains more than one representation, i.e. multiple representations of the same discrete entity at the same time point. These representations in a set of representations may be generated to represent the information contained in the marker to different preferably increasing degrees. This enables the progressive or stepwise comparison of equivalent representations from pairs of sets of representations starting from representations with a lower information content proceeding to representations with a higher information content. This minimizes computational load and improves the speed of recognition. Representations in a set of representations may be of the same kind, e.g. in all graph-based, they may also be of different kinds, e.g. some graph-based, some vector-based. Representations in a set of representations may be from the same domain. Representations in a set of representations may be from different domains, e.g. the spatial and the frequency domain. Representations in a set of representations may be from different domains, e.g. the spatial and the frequency domain, and of different kinds. An example of the latter would be a set of representations including an FFT spectrum, a graph-based, and a vector-based representation. The set of representations may also include the original raw image data, reflecting the representation with a high information content.

In a preferred embodiment, each set of representations is classified based on spatial and/or physical characteristics of the respective marker or a part of that marker. This enables fast comparing and matching of the set of representations.

In an embodiment, the second set of representations is matched to the first set of representations depending on the classification of the set of representations. This enables fast comparing and matching of the set of representations.

In particular, the second set of representations is matched to the first set of representations depending on a statistical confidence score. Methods to generate the statistical confidence score might include cluster analysis, graph matching, measuring the similarity of vector fields using global distribution, 3D surface matching, as well as FFT and fingerprinting. This enables reliable and reproducible matching of set of representations.

The discrete entity of the second optical read-out is recognized as the target discrete entity when the second set of representations matches the first set of representations. Matching in this context depends in particular on the amount or the total number of the discrete entities which need to be recognized and/or on the type of marker or markers which the discrete entities comprise. In some cases, a match is determined between the second set of representations and the first set of representations depending on a statistical confidence score, which is determined when the second set of representations is compared to the first set of representations. The statistical confidence score describes the probability of two particular sets of representations being sets of representations of the same discrete entity. Thus, for each pair of first and second sets of representations a statistical confidence score can be calculated based on the probability of the pair of representations being representations of the same discrete entity. Thus, a predetermined confidence level can be chosen as a threshold value for the statistical confidence scores which are determined in the comparisons.

For all cases in which the set of representations contains more than one representation equivalent representations from different sets of representations are compared with each other. In this case all or some of the representations of a set may be compared to equivalent representations of a different set. Typically, in cases in which the set of representations contains more than one representation, equivalent representations from different sets of representations are compared with each other in a sequential fashion starting from the lower information content representations proceeding to the higher information content representations. This allows balancing speed of generating, accessing, storing, retrieving, and matching representations with the requirements regarding total number of unique identifiers and statistical confidence in a match or recognition. Thus, if a pair of equivalent representations is recognized to be representations of the same discrete entity based on a certain level of statistical confidence also the respective sets of representations that contain said equivalent representations of the pair are recognized as being a pair of sets of representations representing the same discrete entity.

Furthermore, a dynamic adaption of the matching criteria might be implemented, either by conducting at least one further read-out of the same discrete entity or by applying different strategies for the comparison of the representations, such that the statistical confidence score can be improved which leads to a higher confidence level regarding a valid conclusion that a pair of representations belongs to the same discrete entity.

Furthermore, a dynamic adaption of the set of representations generation criteria might be implemented such that more set of representations, preferably of higher information content, can be dynamically generated ("on-the-fly") to increase the statistical confidence in a match for a target entity or group of target entities of interest. This allows the user to selectively accept an increase in the computational load and consequent reduction in speed to increase robustness and statistical confidence of matching for a user defined set of target entities of interest. This is relevant in rare cell identification workflows in which a very large number of cells might be pre-screened to isolate a rare cell population, like for example T-cells reactive to a certain tumour neoantigen, and in which this said population of cells is then subsequently tracked over the course of time. In such a case a lower statistical confidence in matching might be acceptable in the pre-screen time points and a higher statistical confidence in the matching may be needed in later time points.

According to another aspect, a device for optically recognizing or identifying at least one target discrete entity from a plurality of discrete entities in a liquid is provided, each discrete entity comprising a biological sample and a marker, the device comprising: an imaging container configured to contain at least one of the discrete entities; a detector and optical means for imaging or projecting at least partially the discrete entity onto the detector; a control unit configured to: acquire a first optical read-out of the marker of at least one discrete entity from the plurality of discrete entities, said discrete entity defining the target discrete entity; generate a first set of representations of the marker based on the first optical read-out of the marker of the target discrete entity and associate the first set of representations with the target discrete entity; acquire a second optical read-out of the marker of at least one discrete entity from the plurality of discrete entities; generate a second set of representations of the marker based on the second optical read-out of the marker of the discrete entity; compare the second set of representations to the first set of representations; recognize the discrete entity of the second optical read-out as the target discrete entity, when the second set of representations matches the first set of representations. The device can be adapted to carry out a method of one of claims 1 to 15.

The objective is furthermore solved by the subject matter of claim 17. Accordingly, a method for a workflow is provided comprising the following steps: (a) forming a plurality of discrete entities in a liquid, the discrete entities containing biological samples and comprising markers; (b) generating at least one set of representations of a marker of a discrete entity for each discrete entity of a plurality of discrete entities by optical read-out of at least a part of the plurality of discrete entities; (c) at least one of cultivating, treating (e.g. through application of at least one of, small molecule compound, a biologic, a nucleic acid, a protein, a secreted protein, a growth factor, a signalling molecule, a cytokine, a neurotransmitter, a hormone, an antigen, an antibody, a virus, a bacterium, an agent to knockdown gene expression like RNAi constructs, CRISPR/CAS), sample processing (e.g. at least one of fixation, permeabilization, hydration, dehydration, clearing, expansion), staining (e.g. at least one of histological stains, dyes, fluorescent labels, direct and indirect immunofluorescence, multiplex immunofluorescence, fluorescent in situ hybridization), and storing the part of the plurality of discrete entities under at least one predefined condition; (d) generate further set of representations of markers of discrete entities for at least a part of the discrete entities being cultivated or stored by further optical read-outs after a predefined time period; (e) comparing the set of representations to the further set of representations; (f) depending on the outcome of step (e), either repeating step (c) or conveying discrete entities being selected according to at least one predefined criterium to an analysis step or to a further processing step.

The method for a workflow preferably comprises the identification and/or the recognition of the at least one discrete entity being carried out by a method according to one of the claims 1 to 15 or being carried out by a device according to claim 16.

Furthermore, in an embodiment, at least one set of representations of a marker is generated from optical read-outs of markers of discrete entities by a method according to an embodiment or which are generated by a device according to an embodiment or which are used in the workflow according to an embodiment.

A computer program with a program code for performing the method according to an embodiment when the computer program is run on a processor and/or a computer-readable medium comprising, stored thereon, the computer program, solve the objective, respectively.

FIG. 1 is a schematic diagram of a hydrogel bead 100, as an example of a discrete entity. The discrete entity contains a biological sample 102 and microbeads 104. The shown hydrogel bead 100 is one example of a plurality of hydrogel beads. The hydrogel bead 100 is made of a polymeric compound, in particular, a polymeric compound that forms a hydrogel and/or that is substantially transparent. The polymeric compound may be of natural or synthetic origin, including for example, agarose, alginate, chitosan, hyaluronan, dextran, collagen and fibrin as well as poly(ethylene glycol), poly(hydroxyethyl methacrylate), poly(vinyl alcohol) and poly(caprolactone). Further examples include basement membrane extracts, which may include Laminin I, Collagen I, Collagen IV, Vitronectin and Fibronectin amongst others, and extracellular matrix preparations, including for example, Cultrex, Matrigel, or Jellagel. The hydrogel bead 100 may be made of a single or several different polymeric compounds.

Figure 2:
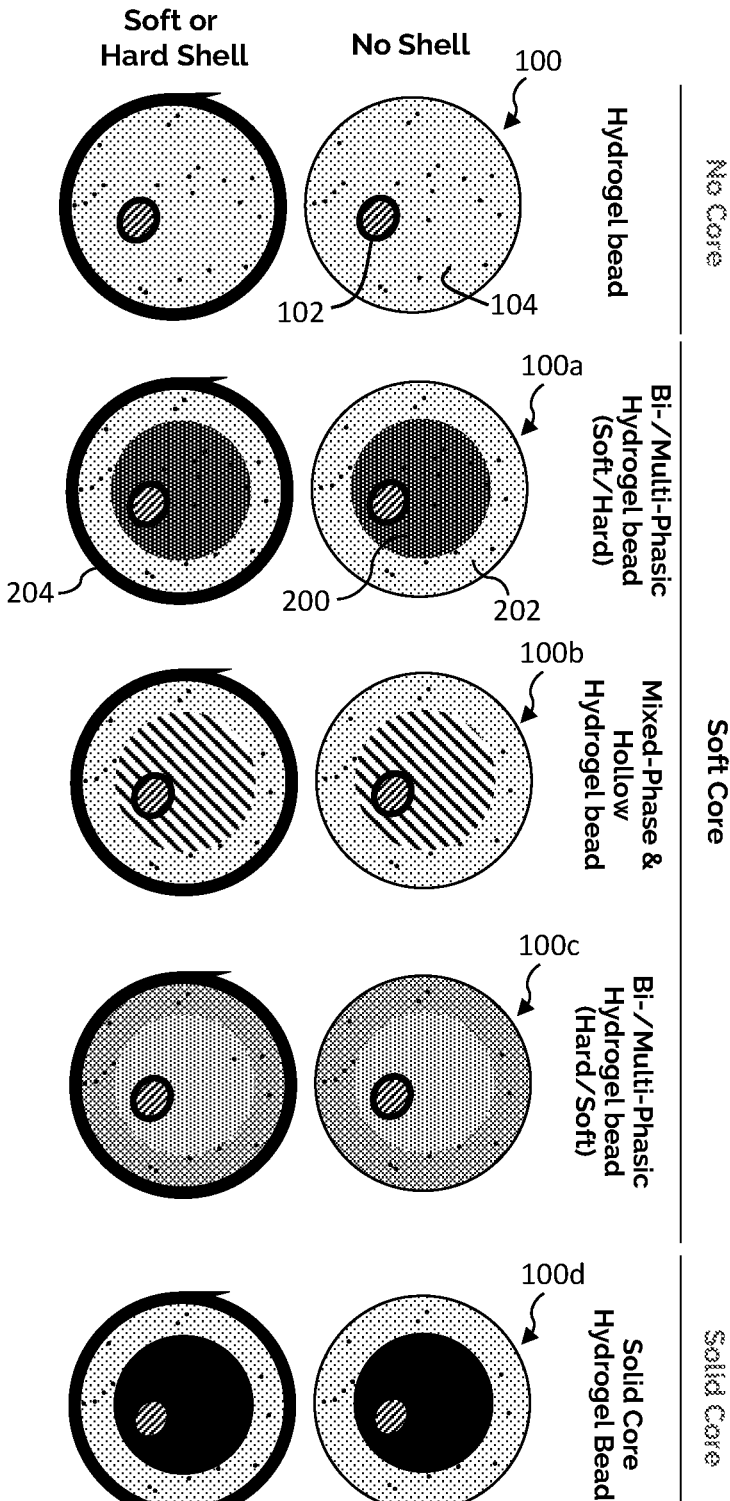
FIG. 2 shows further embodiments of hydrogel beads.

FIG. 2 shows further embodiments of hydrogel beads. For example, the hydrogel bead 100a comprises several sections such as an inner core 200, an outer layer 202 around the core 200. Each of the sections can be made of a particular polymeric compound. For example, the hydrogel beads 100a to 100d have different compositions. In addition, hydrogel beads 100, 100a to 100d may comprise an outer shell 204, the outer shell encapsulating the respective hydrogel bead. Moreover, the hydrogel beads 100, 100a to 100d may comprise sections that are made of other compounds that do not form hydrogels. Thus, the sections of the hydrogel bead 100, 100a to 100d can each have different properties. These properties include physicochemical properties such as Young's modulus, refractive index, and chemical composition and functionalisation.

The shape of the hydrogel bead 100 is spherical. Alternatively, the hydrogel bead 100 may have a different shape such as a spheroid. The diameter of the hydrogel bead 100 may be in the range of 10 µm to 10 mm. Preferred ranges are 10 µm to 100 µm, 50 µm to 250 µm and 500 µm to 5 mm.

Figure 3:
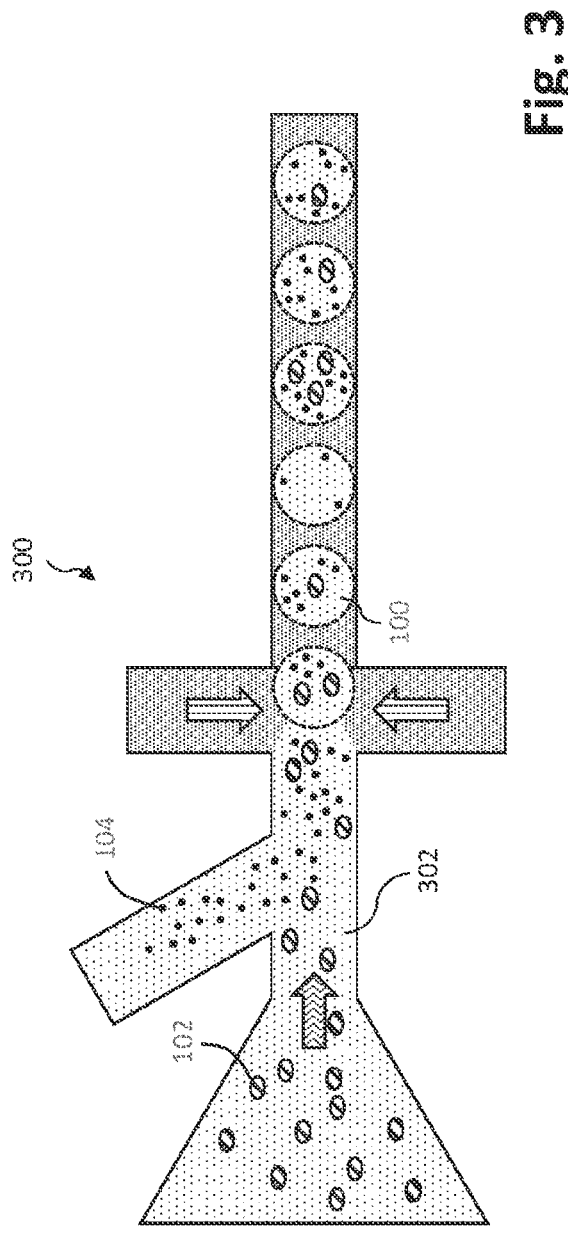
FIG. 3 shows a schematic view of a microfluidic device for forming hydrogel beads according to some embodiments.

FIG. 3 shows a schematic view of a microfluidic device 300 for forming hydrogel beads 100. The hydrogel bead 100 can be formed, for example, by electrospray, emulsification, lithography, 3D printing and microfluidic approaches. The shown microfluidic device 300 comprises several channels through which non-polymerised hydrogel 302 and other liquids can flow. Further, microbeads 104 may be added, before forming the hydrogel bead and polymerising the hydrogel. During formation of the hydrogel bead 100 further compounds and structures can be included in the hydrogel bead 100, as detailed in the following.

The hydrogel bead 100 includes the biological sample 102, for example, a cell 102 or a cluster of cells 102. The cell 102 may be a eukaryotic or a prokaryotic cell, including archaea, bacteria, plant, mammalian, non-mammalian cells and fungi. The cluster of cells 102 may be a spheroid, a tumoroid or an organoid. In addition, the biological samples 102 can be a co-culture of different cell types, bacteria, viruses, prions, cellular pathogens and/or multicellular parasites. The biological sample 102 can be suitable for analytical, diagnostic, and/or therapeutic applications.

In addition, the hydrogel bead 100 comprises a plurality of fluorescent microbeads 104. The fluorescent microbeads 104 are included and randomly dispersed in the hydrogel bead 100 during the formation of the hydrogel bead 100. After the formation of the hydrogel bead 100, the microbeads 104 are set in place in the hydrogel bead 100. This means the microbeads 104 do not change their location in the hydrogel bead 100 once the hydrogel bead 100 is formed, resulting in substantially stable discrete entities or hydrogel beads 100. The hydrogel bead 100 might be deformed at a later point in time, e.g. by growth of the cells 102, an influence caused by cultivation or processing of the hydrogel bead 100 in the liquid. The diameter of the microbeads 104 might be in the range of 50 nm to 500 nm.

Alternatively, the marker 400 can comprise only a selection of the microbeads 104 from the plurality of microbeads 104. For example, a marker of the hydrogel bead 100 may comprise several clusters of microbeads 104. The selection of microbeads 104 may, for example, be made by predetermined parameters, for which lower and upper limits may be set, such as, number of microbeads 104, a minimum and/or maximum distance to neighbouring microbeads 104, average brightness, colour, life-time of microbeads 104.

Alternatively or additionally, the constituent parts of a marker may be structures or compounds that are different from the fluorescent microbeads 104. This includes, for example, non-fluorescent microbeads, areas of the hydrogel bead 100 that are coloured by means of a dye, or a continuous distribution of phase or intensity objects 402, 404.

Figure 4:
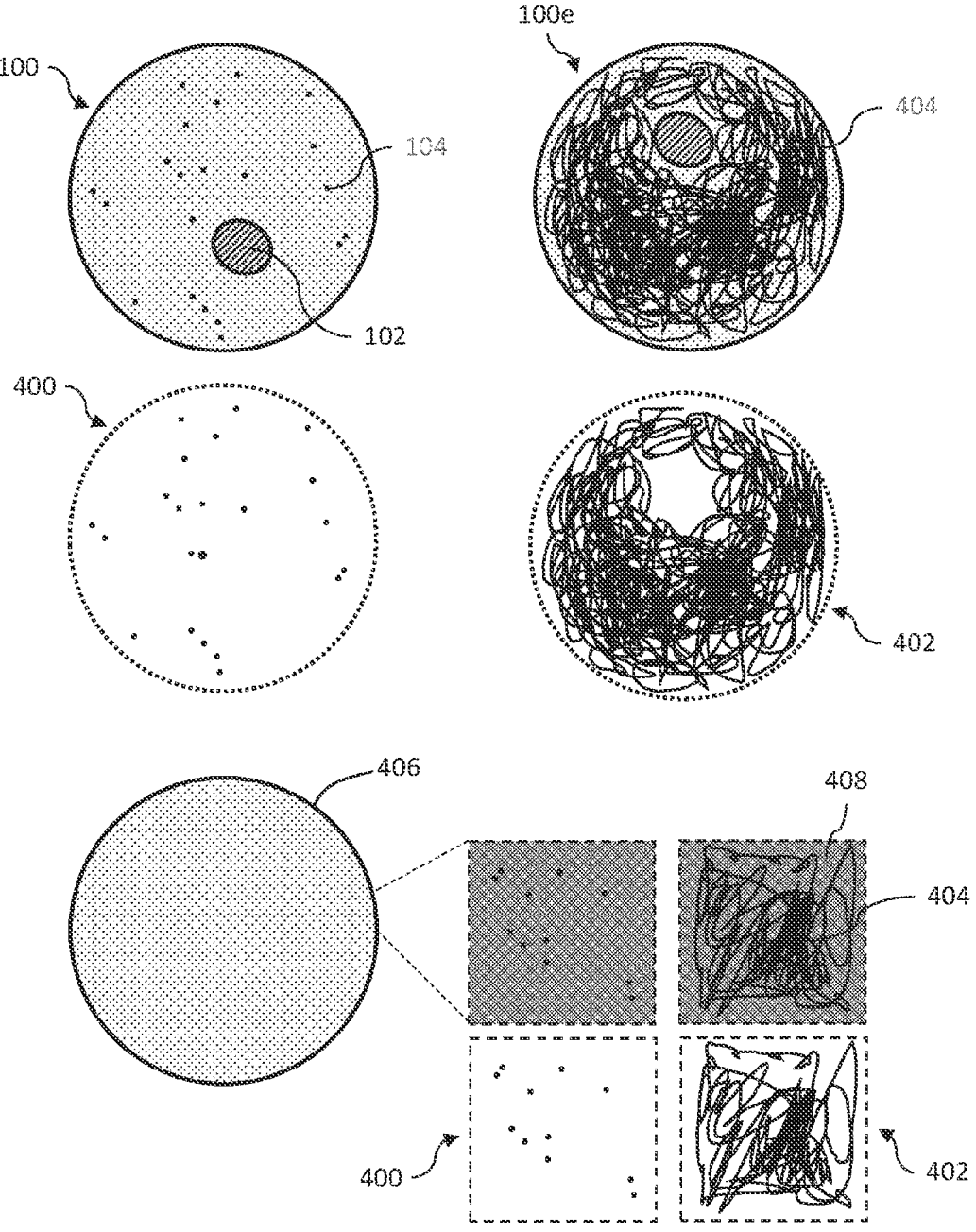
FIG. 4 shows a schematic view of hydrogel beads with markers with different constituent parts of the markers according to some embodiments.

Alternatively or additionally, a marker or parts thereof may derive from the biological sample 102. In a further example, the constituent parts may include structures of the hydrogel bead 100 that are generated during formation of the hydrogel bead 100, such as random imperfections on the surface 406, 408 of the hydrogel beads 100, 100e, and that are inherent to the method of formation of the hydrogel bead 100, 100e. In this case, the constituent parts may be on the outside, for example on the surface, of the hydrogel bead 100. Further constituent parts of the marker may be applied to the surface 406, 408 of the hydrogel bead 100, 100e such that the entirety of the marker or parts thereof are on the surface 406, 408 of the hydrogel bead 100, see e.g. FIG. 4. Additionally, the marker may be applied to the surface of an internal phase of a multi-phase hydrogel bead such that the marker will form a spherical layer inside of the hydrogel bead 100. Further, the constituent parts of the marker can be a colour gradient or an intensity gradient.

Figure 5:
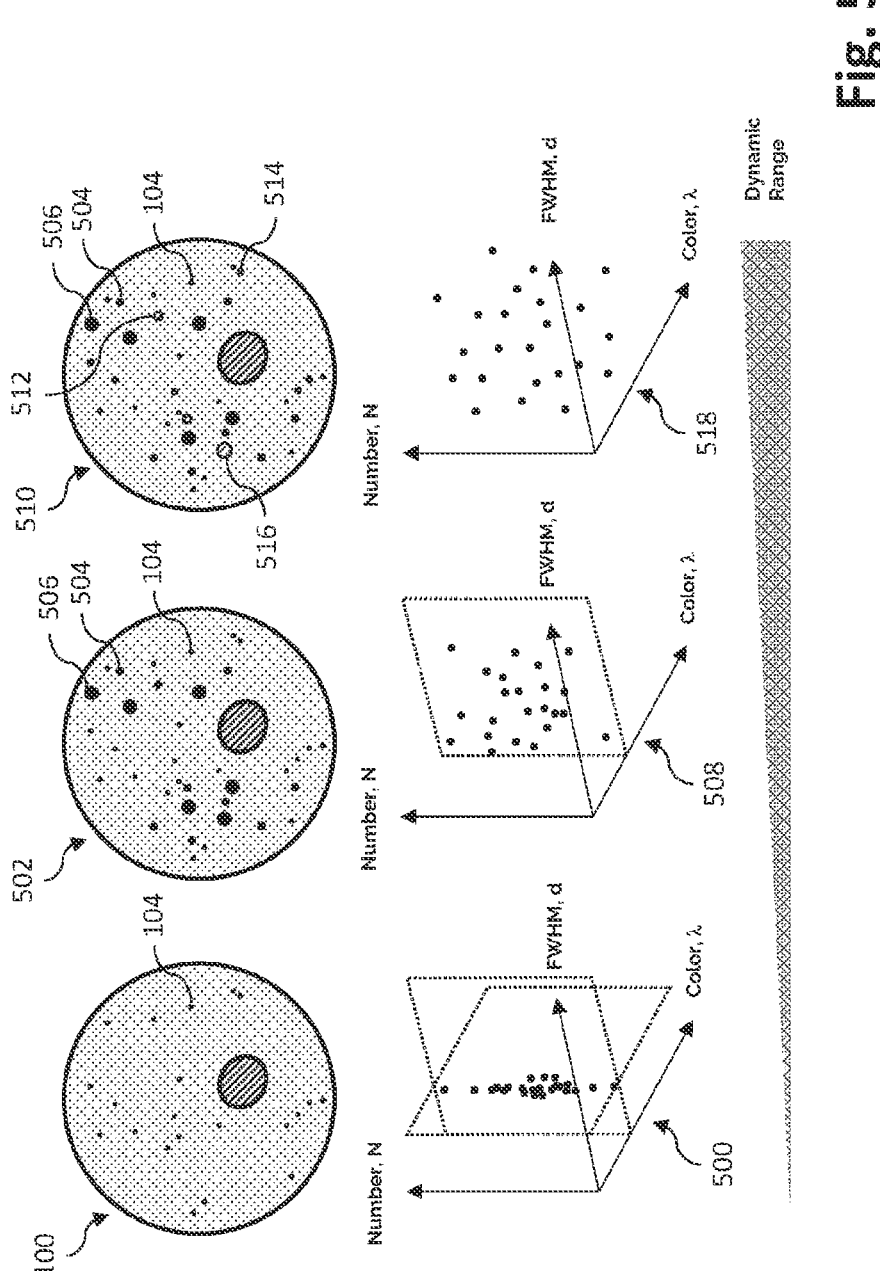
FIG. 5 shows an illustration of the relationship between characteristics of markers and the ability to generate unique markers according to some embodiments.

FIG. 5 shows an illustration of a relationship between characteristics of markers and the ability to generate unique markers. FIG. 5 shows three hydrogel beads 100, 502, 510 with each hydrogel bead featuring a corresponding marker and each marker having differing characteristics. In particular, the constituent parts of each marker have differing characteristics. Further, visualisations of the markers of a plurality of hydrogel beads are shown as dots in an n-dimensional vector space/coordinate system, in which each dimension represents a recognizable characteristic of the constituent parts of the markers: number, N, of microbeads 104 in a hydrogel bead 100, size or full-width half maximum, FWHM, and colour or peak emission wavelength, $\lambda$. FIG. 5 further shows examples of random placements with fluorescent microbeads. The first hydrogel bead 100 comprises microbeads 104 of a single size and a single colour, shown on the upper left side. Below and in the coordinate system 500 the size is shown by a narrow distribution of full-width half maximum, FWHM, and the colour is shown by a narrow distribution of a peak emission wavelength $\lambda$. The differing characteristics of the markers, i.e. the separation of dots representing the markers in the n-dimensional vector space, in this case result mostly from differences in the number N of microbeads 104 that each hydrogel bead 100 includes and their placement inside the hydrogel bead 100. One point in coordinate system 500 represents one hydrogel bead 100 with N microbeads 104. A second hydrogel bead 502 comprises microbeads 104, 504, 506 of different sizes which increase the width of the distribution in that dimension (FWHM), see coordinate system 508. This increases the probability or ability to generate e.g. a higher number of unique markers, e.g. during formation of the hydrogel bead. This ability might be also called dynamic range. The use of a larger number of characteristics and each characteristic varying over a wider range increases the dynamic range as well as the separation of individual markers in n-dimensional vector space. On the right side, a third hydrogel 510 bead includes microbeads 104, 504, 506, 512, 514, 516 of different colours as well as varying sizes. This widens the distribution along both dimensions (FWHM, d and Colour, k) and thus even further expands both the dynamic range of unique markers as well as the separation of the constituent parts of the marker in the n-dimensional vector space (see coordinate system 518). In this way including more characteristics or dimensions in the generation of the marker significantly increases the distance between the markers in an n-dimensional vector space, i.e. significantly increases both the number of unique markers (dynamic range) that can be generated and makes them easier to identify and discern from other markers at a given level of statistical confidence.

By including additional characteristics of the marker, such as size, shape, fluorescent intensity, wavelength, colour, phase, and fluorescence lifetime, or characteristics that differ over a wider range, this dynamic range can be further increased. While the absolute number of unique markers may in any case by far exceed the number that are needed in most applications, it might be of considerable practical value to use a wider n-dimensional vector space and work with wider n-dimensionally spaced distributions as this might increase e.g. statistical confidence when comparing and matching sets of representations and render the process very robust against perturbations of the marker. Perturbations of the marker may arise from physical drift, deformation, photobleaching and internal changes, for example, resulting from growth or motility of the biological sample. This is also helpful for the identification of a very high number of discrete entities.

Figure 6:
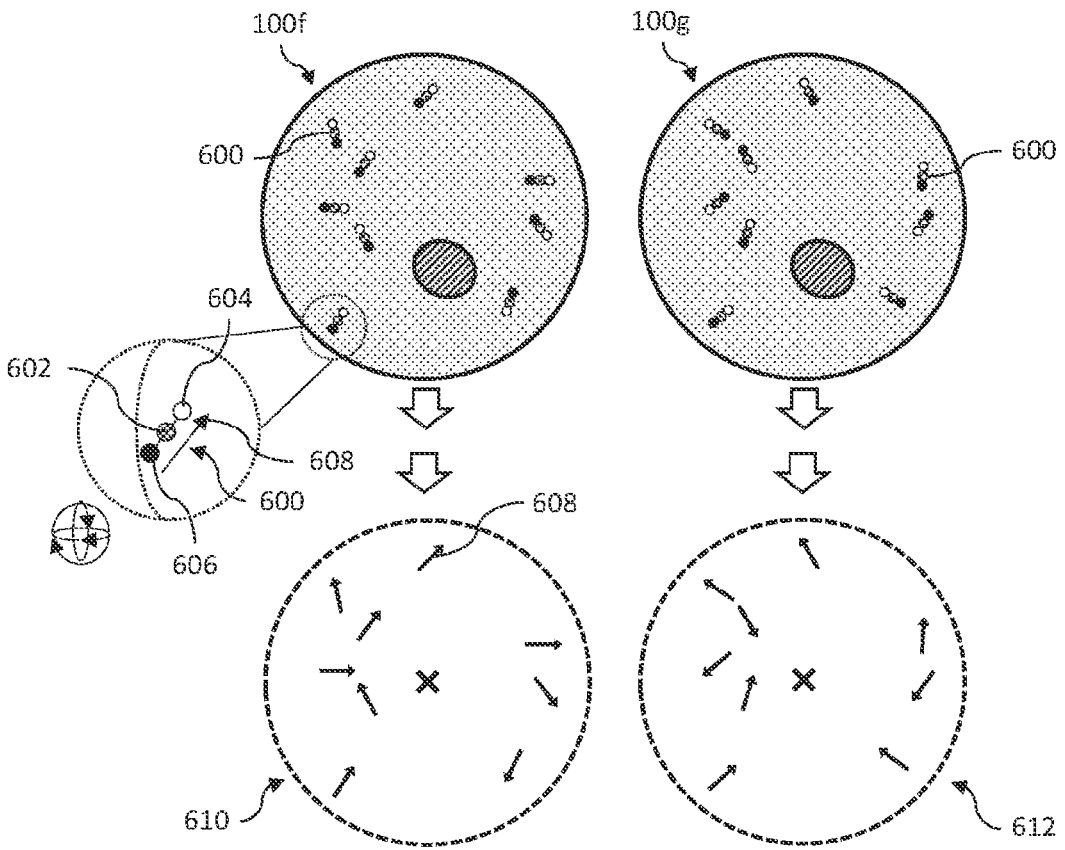
FIG. 6 shows a schematic view of hydrogel beads with markers comprising nanorulers according to some embodiments.

FIG. 6 shows a schematic view of hydrogel beads 100f, 100g with markers comprising nanorulers 600. The marker has constituent parts, which are at least two intensity or phase point objects physically connected in a rigid manner. For example, by a nanoruler 600, which is composed of a nucleic acid 602 and a series of dyes 604, 606 that each have different spectral and/or life time properties. The dyes 604, 606 are coupled to the nucleic acid 602 at a predetermined distance. Nanorulers 600 and similar structures are constituent parts of a marker and can be used to generate the marker instead of or in addition to e.g. microbeads 104. As the nanoruler 600 has an intrinsic directionality or shape, they can be directly represented as a vector 608 or as a respective shape when generating a set of representations. As each of these vectors 608 can point into any direction they considerably increase dynamic range, as described above, and the number of unique markers. Even for an identical number of nanorulers 600 of a hydrogel bead 100g and an identical placement of the nanorulers 600 with respect to the X,Y,Z position of their centres of mass of the hydrogel bead, the rotational degrees of freedom of the nanorulers 600 result in a high number of possible orientations of the same, and therefore in a high number of unique set of representations 610, 612. Something comparable can be accomplished by using microbeads having an asymmetric or elongated shape or comparable fluorescent particles.

In another example, the constituent parts of the marker may be generated after the formation of the hydrogel bead 100. This can be achieved by including compounds in the hydrogel bead 100 when forming the hydrogel bead 100 that generate the constituent parts of the marker after the formation of the hydrogel bead 100. Compounds can be included in the hydrogel bead 100 that can be activated, deactivated or bleached photochemically after formation of the hydrogel bead 100. In a subsequent lithographic, in particular in a photolithographic step, the compounds may be activated, deactivated or bleached photochemically by means of a focused light beam, or by imaging or projecting a pattern on the hydrogel bead 100.

Figure 7:
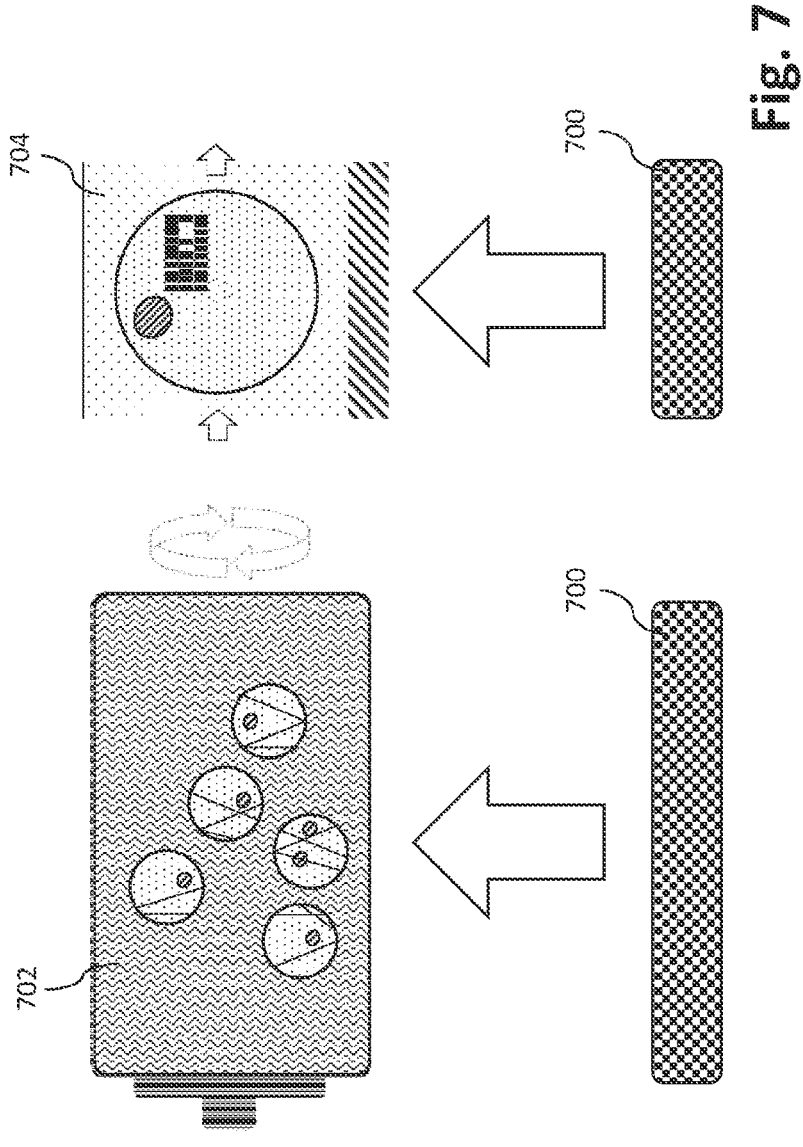
FIG. 7 shows a schematic view of a lithographic device for generating markers according to some embodiments.

FIG. 7 shows schematic views of a lithographic device 700 for generating markers. This lithographic device, in particular a photolithographic device 700, may be used to generate photochemically or photophysically changed areas in the hydrogel bead 100 as the constituent parts of the marker. The photolithographic step can be performed either in batch for example in a flask 702, effecting a plurality of hydrogel beads simultaneously, or sequentially in a flow cell 704. Only a part of the flow cell 704 is shown in FIG. 7.

Usually, a flow cell has an entrance upstream in relation to the flow direction of the liquid, an exit downstream in relation to the flow direction of the liquid and the photolithographic device 700 might be arranged somewhere between the entrance and the exit of the flow cell.

Figure 8:
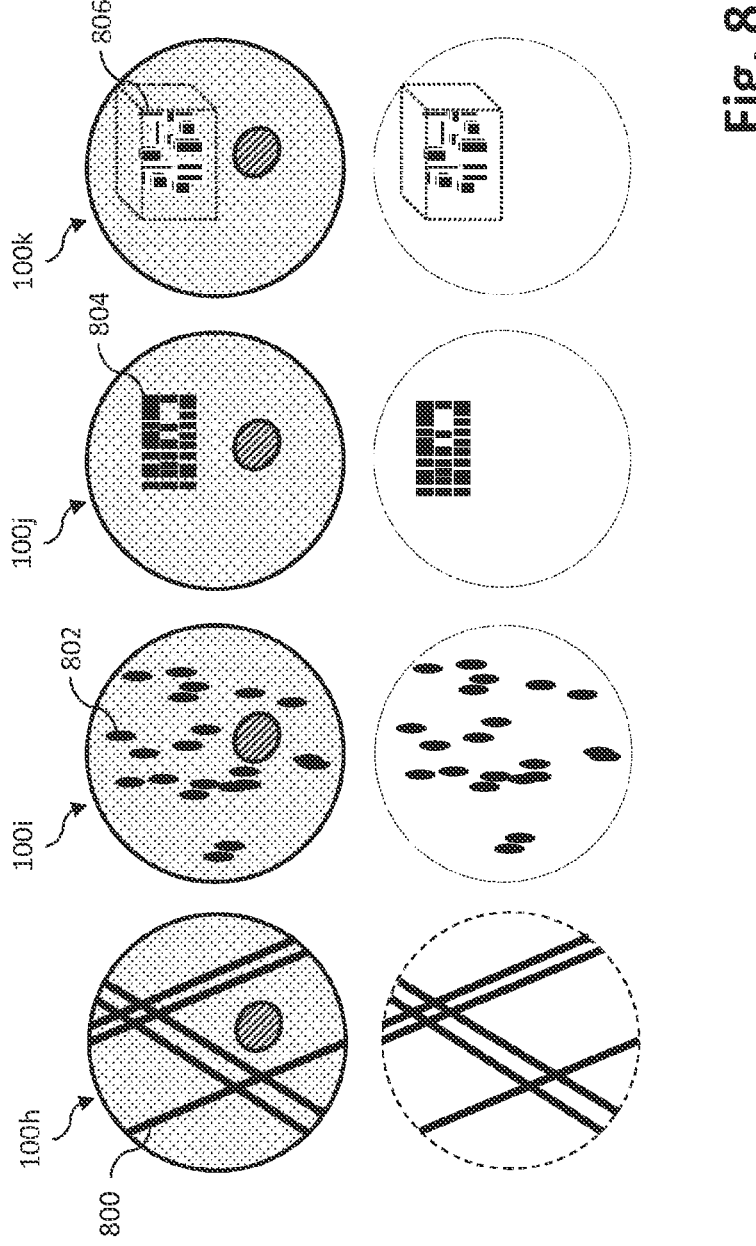
FIG. 8 shows a schematic view of hydrogel beads with lithographically generated markers according to some embodiments.

FIG. 8 shows a schematic view of hydrogel beads 100h to 100k with lithographically generated markers. The photochemically or photophysically changed areas may be generated stochastically or deterministically. When generated stochastically, the changed areas are generated at random locations in the hydrogel bead 100. For example random distributions of stripes 800, points 802, or similar distributions may be randomly generated.

Photolithographically generated markers may be in the form of barcodes or stacked barcodes 804. Further, a multi-photon photolithographic device may be used to generate photochemically or photophysically changed areas that are arranged in a three-dimensional pattern 806 in the hydrogel bead 100k.

When generated deterministically, the changed areas are generated such that for each hydrogel bead 100 in the plurality of hydrogel beads, a unique pattern of changed areas is generated. In particular, this may be in the form of one or more barcodes. Further, this unique pattern may encode additional information, such as a unique identifier as well as further information including information about the origin of the sample or biopsy embedded within the hydrogel bead, the treatment of the sample, date, time, experimenter. Using multi-photon lithography, e.g. by using a multiphoton scanning microscope, it is possible to write three dimensional codes 806 of this type, which significantly increases bit depth of the encoding and thus the amount of information that may be encoded with the unique pattern.

Figure 9:
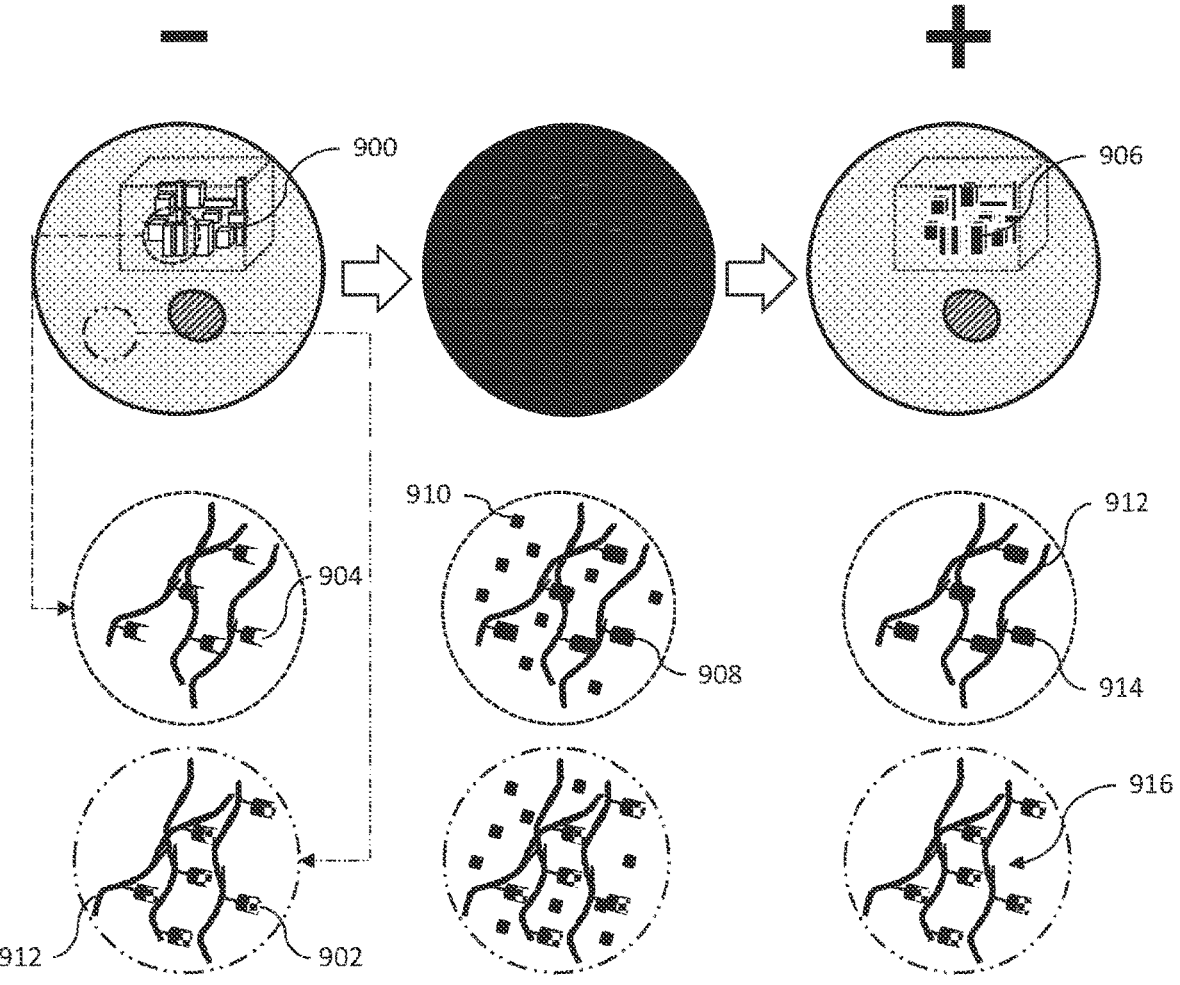
FIG. 9 shows an embodiment for the generation of photolithographic markers in a hydrogel bead.

FIG. 9 shows the generation of photolithographic markers in a hydrogel bead. Photolithographically generated patterns of photochemically or photophysically changed areas might be either positives or negatives. Negatives 900, for example, may be generated by uncaging or deprotecting protected binding sites 902 photochemically, which generates deprotected binding sites 904 in the respective areas. Negatives 900 may then be developed into positives 906 by coupling dyes 908 covalently using click chemistries to unprotected reactive sites 904 for example, which can be efficiently performed by bathing hydrogel beads in activated dye solution 910 followed by washing out unbound dye molecules 910. As the protected binding sites 904 can be covalently linked to the hydrogel polymer 912, covalently coupled dye molecules 914 or other covalently coupled constituent parts of the marker establish a substantially stationary pattern or distribution 916.

By generating a unique pattern or a unique distribution of these specific locations, the marker is generated either directly (direct generation of the positive) or indirectly (direct generation of the negative followed by development which leads to the positive).

In any case, the constituent parts of the marker are optically detectable, for example, as a phase or intensity object by means of a microscope. Thus, the marker is optically detectable. The hydrogel bead 100 needs to be transparent, at least to an extent that allows the sample 102 and the marker to be optically detectable.

Figure 10:
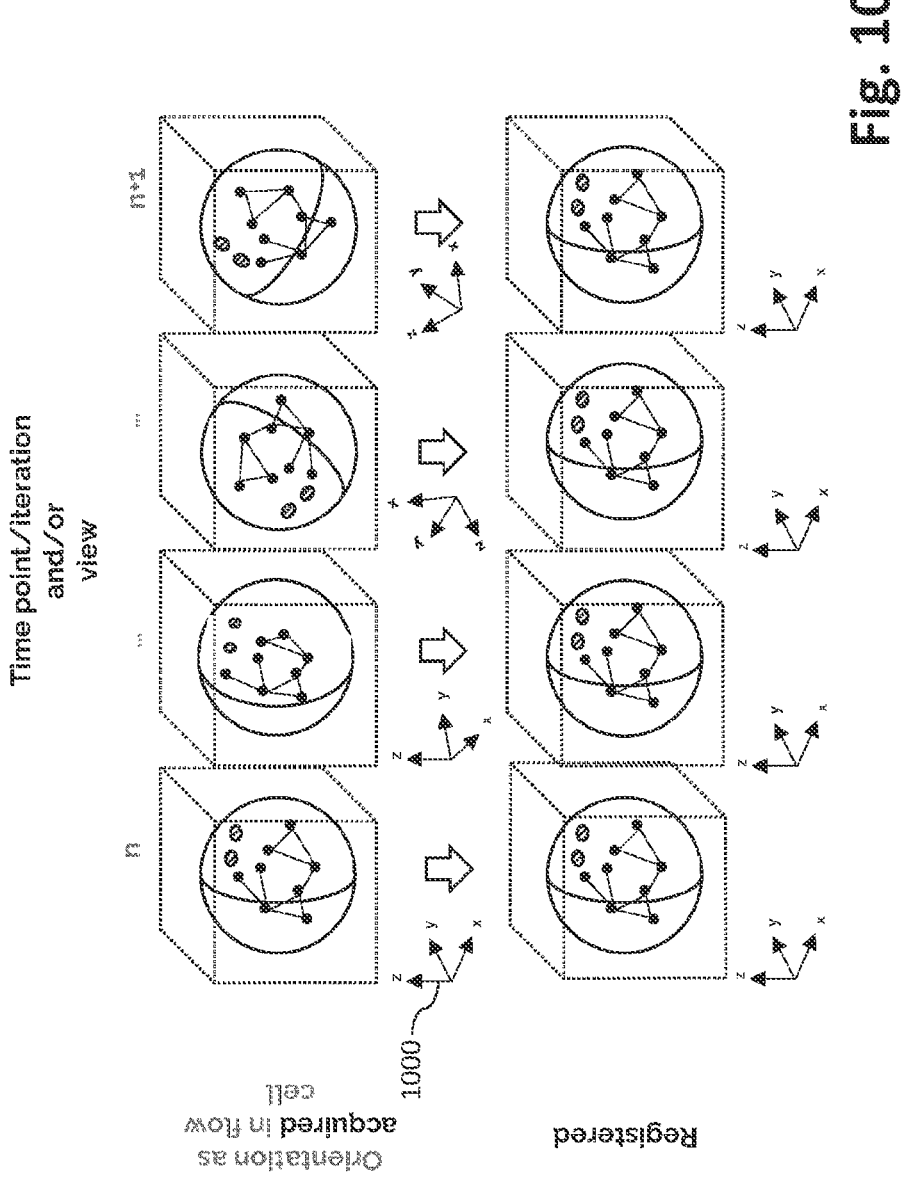
FIG. 10 shows a schematic view of a hydrogel bead with a marker imaged in different orientations according to some embodiments.

FIG. 10 shows a schematic view of a hydrogel bead with a marker imaged in different orientations. For example, the constituent parts of the marker are substantially stationary within or relative the hydrogel bead 100. This means that their location, in particular relative to each other, is substantially stationary in the hydrogel bead 100. Thus, the marker, in particular the constituent parts of the marker, forms a relative coordinate system in the hydrogel bead. This relative coordinate system may be used to define an orientation of the hydrogel bead. This orientation may be determined during imaging in a flow cell. Multiple optical read-outs of the hydrogel bead, for example at different time-points, from different angles or views, can then be aligned and/or registered. These images can then be oriented such that their coordinate systems 1000 are brought into alignment.

It is advantageous that the marker cannot only be used for the recognition of the target discrete entity but also be used for the purpose of registering different views of the same discrete entity obtained by imaging the same discrete entity at different time points and/or from different angles or perspectives. This might provide insights of the development of a biological sample within and relative to the discrete entity it is embedded in.

Further, each marker can be described by a range of physical characteristics. This includes spatial information, for example, the distance between neighbouring constituent parts of the marker. Alternatively, the spatial information can be the distance of each microbead 104 to the centre of the hydrogel bead 100 or the distance to another reference point. Further, the spatial information can also relate to the positioning of the clusters of constituent parts of the marker, such as microbeads 104, to each other. Generally, the hydrogel beads 100 herein are shown in a twodimensional view of the hydrogel beads 100. Since the hydrogel beads 100 are spherical, i.e. three-dimensional objects, the spatial information typically relates to three dimensions.

The random dispersion of the microbeads 104 during formation of the hydrogel bead 100 (FIG. 3) results in a random placement of the microbeads 104 in each hydrogel bead 100 (FIG. 5). Since microbeads are randomly dispersed in three dimensions in the hydrogel bead during its formation, a large number of different markers can be generated for the discrete entities. Depending on the number of microbeads 104 in the hydrogel bead 100 and the number of hydrogel beads 100, the random placement results in a unique placement. Thus, the aggregate of the characteristics of each marker of each hydrogel bead 100 in the plurality of hydrogel beads 100 differs from the aggregate characteristics of each remaining marker. Therefore, the marker of each hydrogel bead 100 is unique with respect to these characteristics.

Figure 11:
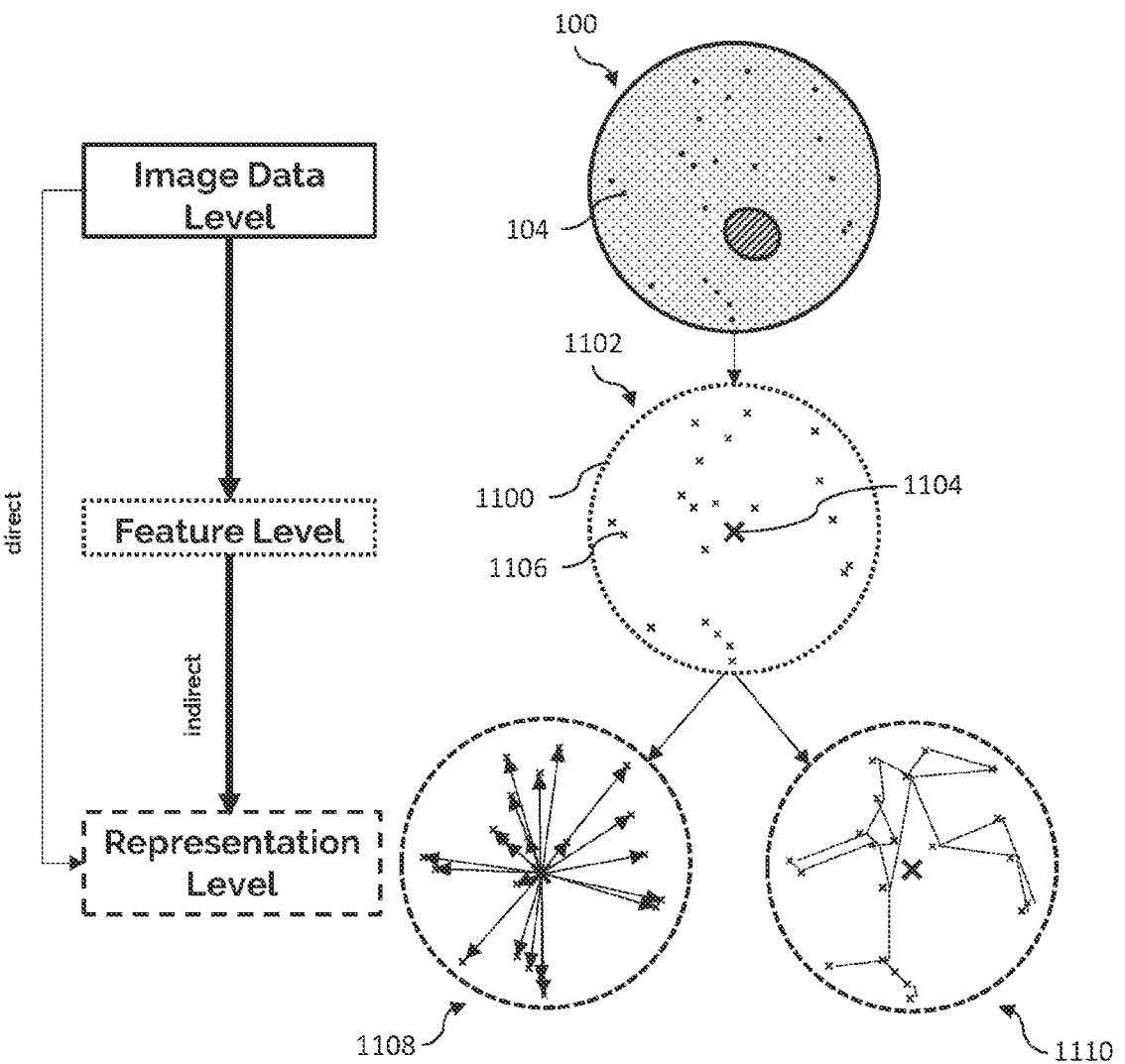
FIG. 11 schematically shows the relationship between an image data level, feature level, and representation level, according to some embodiments.

FIG. 11 schematically shows the relationship between an image data level, feature level, and representation level. As depicted, sets of representations may be directly derived from the image data level, which comprises the image data from the hydrogel beads. In an embodiment, sets of representations are derived indirectly from the feature level. The feature level holds the features that are derived from the image data. The representation level holds the sets of representations. FIG. 11 further illustrates how the n-dimensional image data of the hydrogel bead 100 is used to derive a set of features including a limit 1100 of the segmented (virtual) hydrogel bead 1102, its centre of mass 1104, and the subset of features 1106 derived from the microbeads 104, i.e. the subset of features 1106 represents the marker. Thus, the subset of features 1106 may be the constituent parts of the marker. Further FIG. 11 shows that a set of representations for example a vector-based representation 1108 and a graph-based representation 1110 representing the same hydrogel bead 100 can be derived from the subset of features 1102, which represents the marker. The set of representations may be mathematical descriptions of the marker, in particular of characteristics of the marker and its constituent parts. Different representations of the same marker can be generated in the spatial domain, for example vector-based or graph-based set of representations. The set of representations may be related to the centre of mass 1104 of the hydrogel bead 1102. Additionally, sets of representations may be generated in the frequency domain.

Further mixed sets of representations may be generated, which contain spatial and frequency domain sets of representations of the marker or parts of the marker. Preferably such sets of representations are generated relative to the centre of mass 1104 of the identified microbeads 104.

Figure 12:
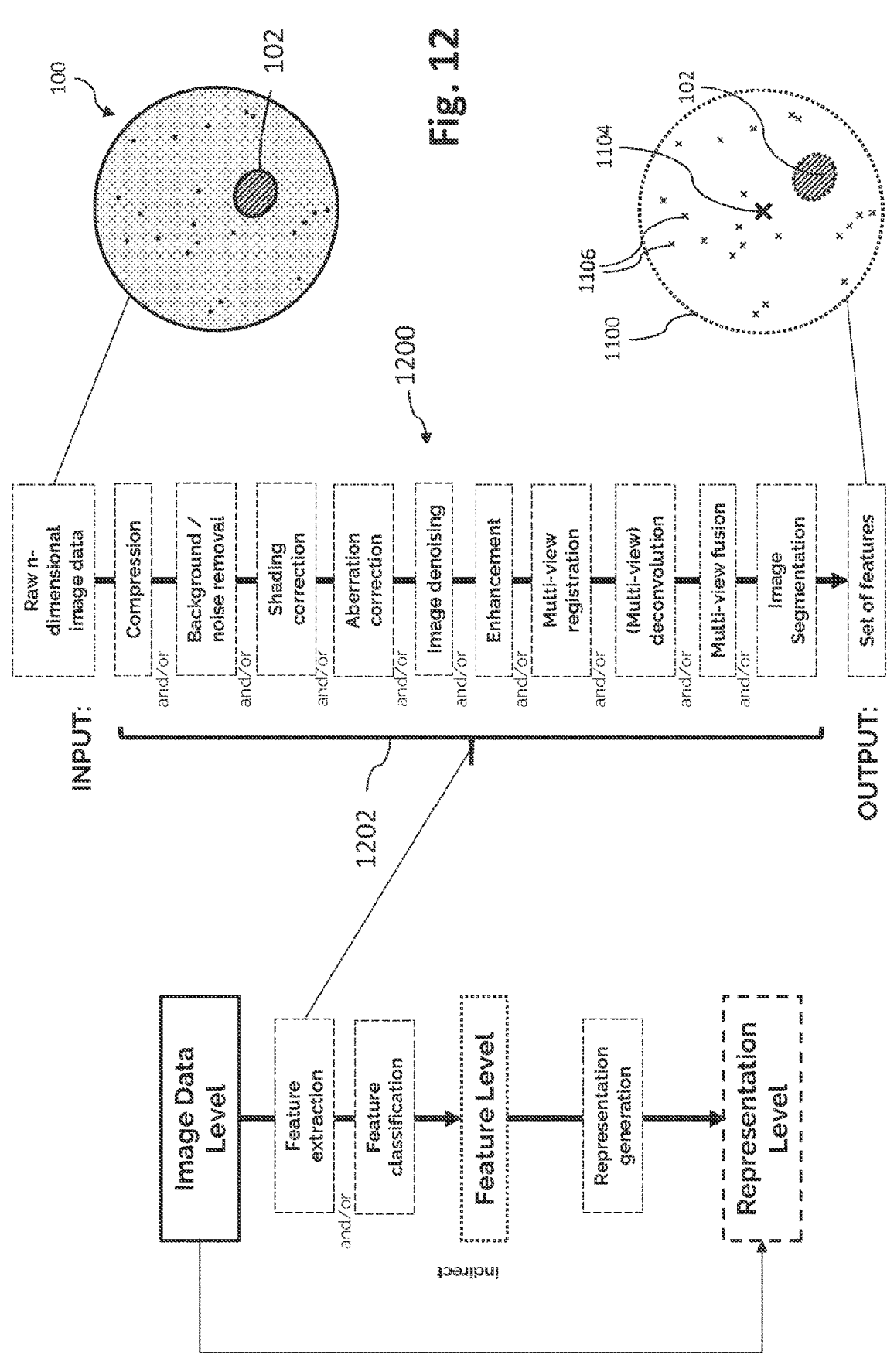
FIG. 12 schematically shows how feature extraction and feature classification connect the image data level to the feature level, according to some embodiments.

FIG. 12 schematically shows how feature extraction and feature classification connect the image data level to the feature level. Further FIG. 12 summarizes the input, output, and possible substeps 1200 of feature extraction. The input to feature extraction is the raw n-dimensional image data of the discrete entities. The substeps 1200 of feature extraction are connected in what is referred to in this document as an image processing pipeline 1202 or image processing algorithm. A given image processing pipeline is configured to yield desirable performance with respect to the particular application and the related requirements in terms of throughput of discrete entities and optical read-outs thereof, speed of recognition, computational load, statistical confidence, amongst other considerations. Certain substeps 1200 may be omitted or repeated, other substeps 1200 not shown in the FIG. 12 may be included in the image processing pipeline. Substeps 1200 of the pipeline may be executed using classical image processing algorithms and/or machine learning, deep learning algorithms. The output of feature extraction might be a set of features, that includes features from the hydrogel bead 100 such as its outer limitations 1100, its volume or centre of mass 1104, the subset of features 1106 derived from the marker, as well as the subset of features derived from the biological sample 102.

Figure 13:
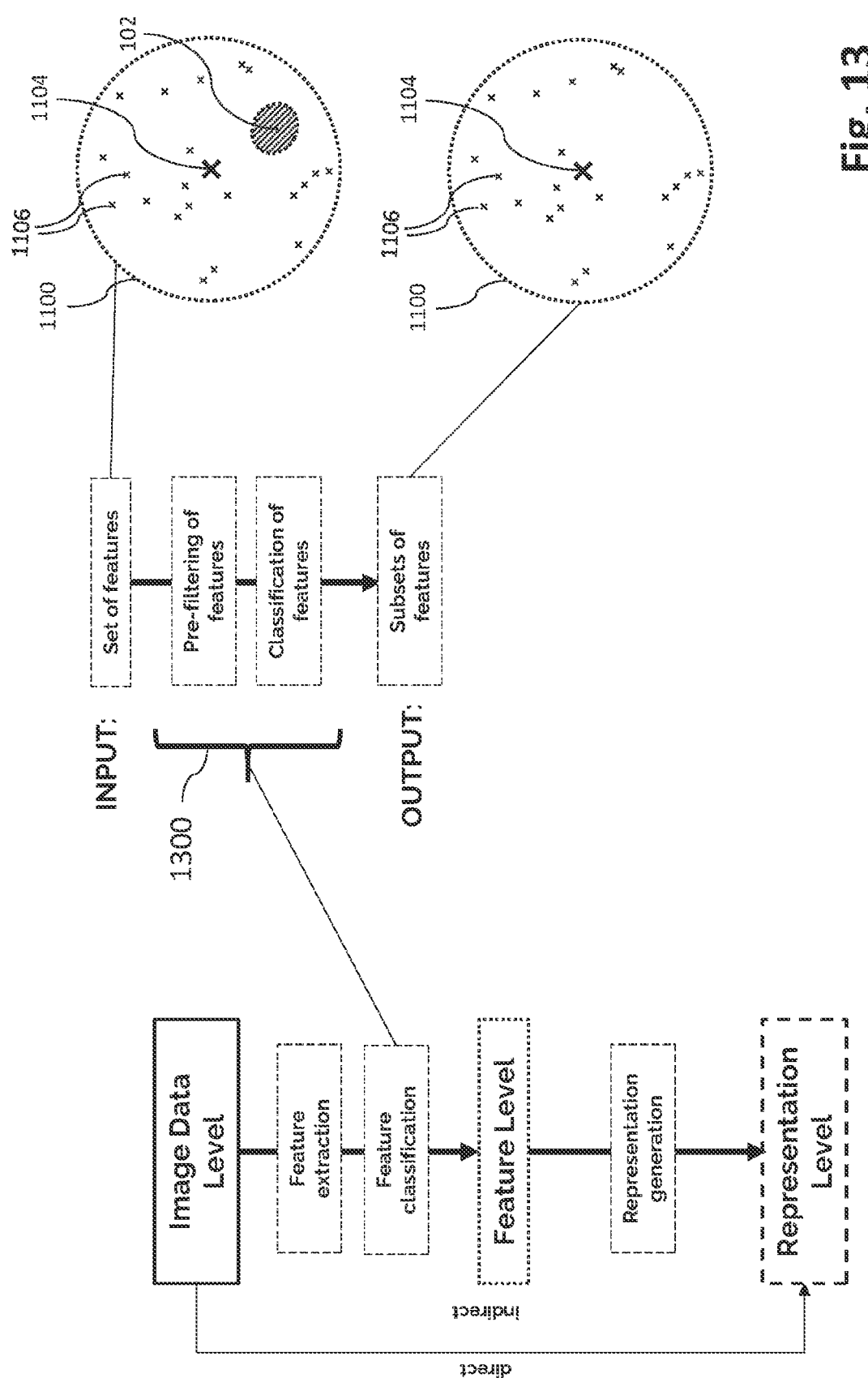
FIG. 13 schematically shows how subsets of features are derived from sets of features according to some embodiments.

FIG. 13 schematically shows how subsets of features are derived from sets of features by means of feature classification by means of pre-filtering features and/or by means of classifying and selecting desired features. The input to feature classification is a set of features. Feature classification can be performed using classical image processing approaches, but benefits from the use of machine learning, deep learning or other AI approaches. The substeps of feature classification are connected in what is referred to in this document as a feature classification pipeline 1300 or feature classification algorithm. Certain substeps may be omitted or repeated, other substeps not shown in the FIG. 13 may be included in the image processing pipeline. Substeps of the pipeline may be executed using classical image processing algorithms and/or machine learning, deep learning algorithms.

The output of feature classification is a subset of features including the desired features, in this case the subsets of features that derive from the marker.

Figure 14:
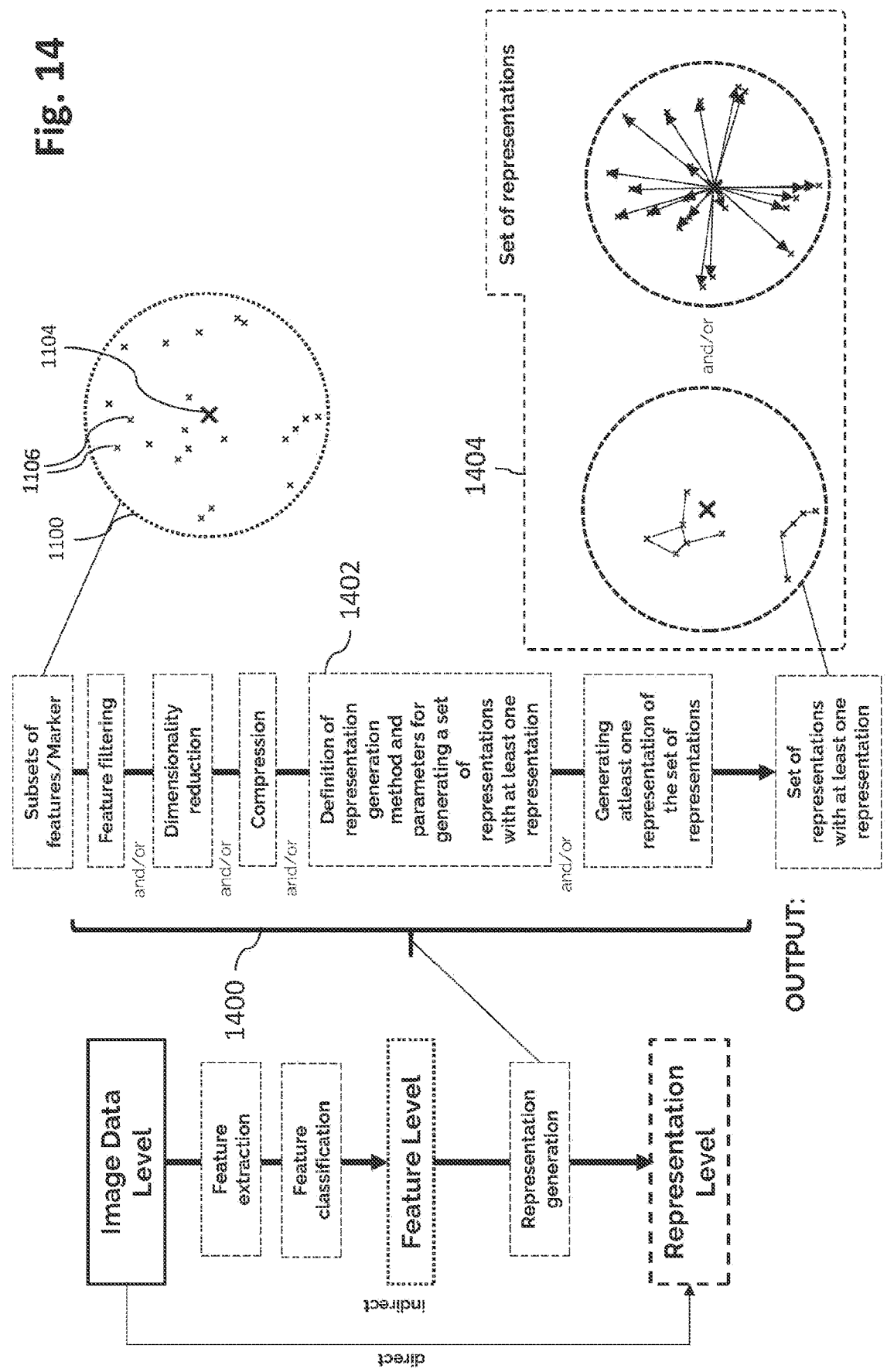
FIG. 14 schematically shows how the feature level and representation level are connected by representation generation according to some embodiments.

FIG. 14 schematically shows how the feature level and representation level are connected by representation generation. The input of representation generation in this case (indirect route) is the subset of features 1106 and other features derived from the hydrogel bead 100 such as the outer limitation 1100, the volume, and centre of mass 1104, which are collectively being used to serve as a spatial reference. The substeps of representation generation are connected in what is referred to in this document as representation generation pipeline 1400 or representation generation algorithm, which has the representation generation method 1402 as a core step. Representations that are generated with the same feature extraction, feature classification, and representation generation pipelines and derive from image data that have been captured using equivalent conditions are referred to as equivalent representations in this document. The output of representation generation is a set of representations 1404 containing at least one representation.

Figure 15:
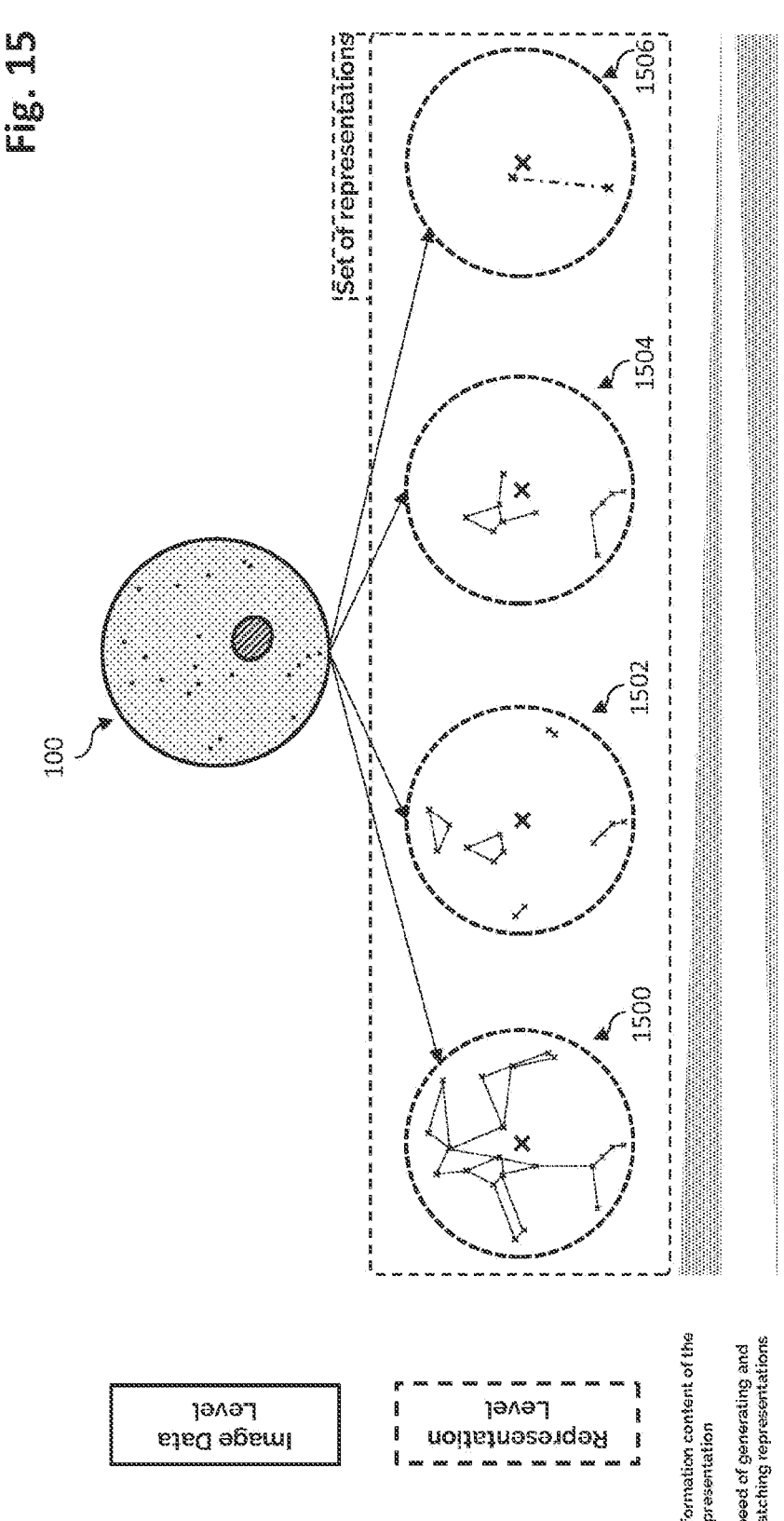
FIG. 15 schematically shows how a set of representations from the spatial domain is related to a given hydrogel bead according to some embodiments.

FIG. 15 schematically shows how a set of representations from the spatial domain is related to a given discrete entity. The set contains 4 graph-based representations 1500, 1502, 1504, 1506 which can be compared to "star constellations" are ordered from right to left starting with lowest information content on the right progressing to higher information content on the left. Representation 1506 is a graph-based representation that reflects the spatial relationship of two graphs identified in 1502 by applying more stringent criteria for "constellation" finding/graph generation. Representation 1502 shows 5 graphs that result from less stringent criteria for "constellation" finding/graph generation. Representation 1500 comprises a graph resulting from "constellation" finding/graph generation resulting from applying criteria which are less stringent than the ones used for representation 1502. The information content in the representations 1500, 1502, 1504, 1506 by necessity scales with the energy needed to generate them, e.g. higher computational load. Likewise, the speed of generating, storing, accessing, comparing improves with lower information content.

Figure 16:
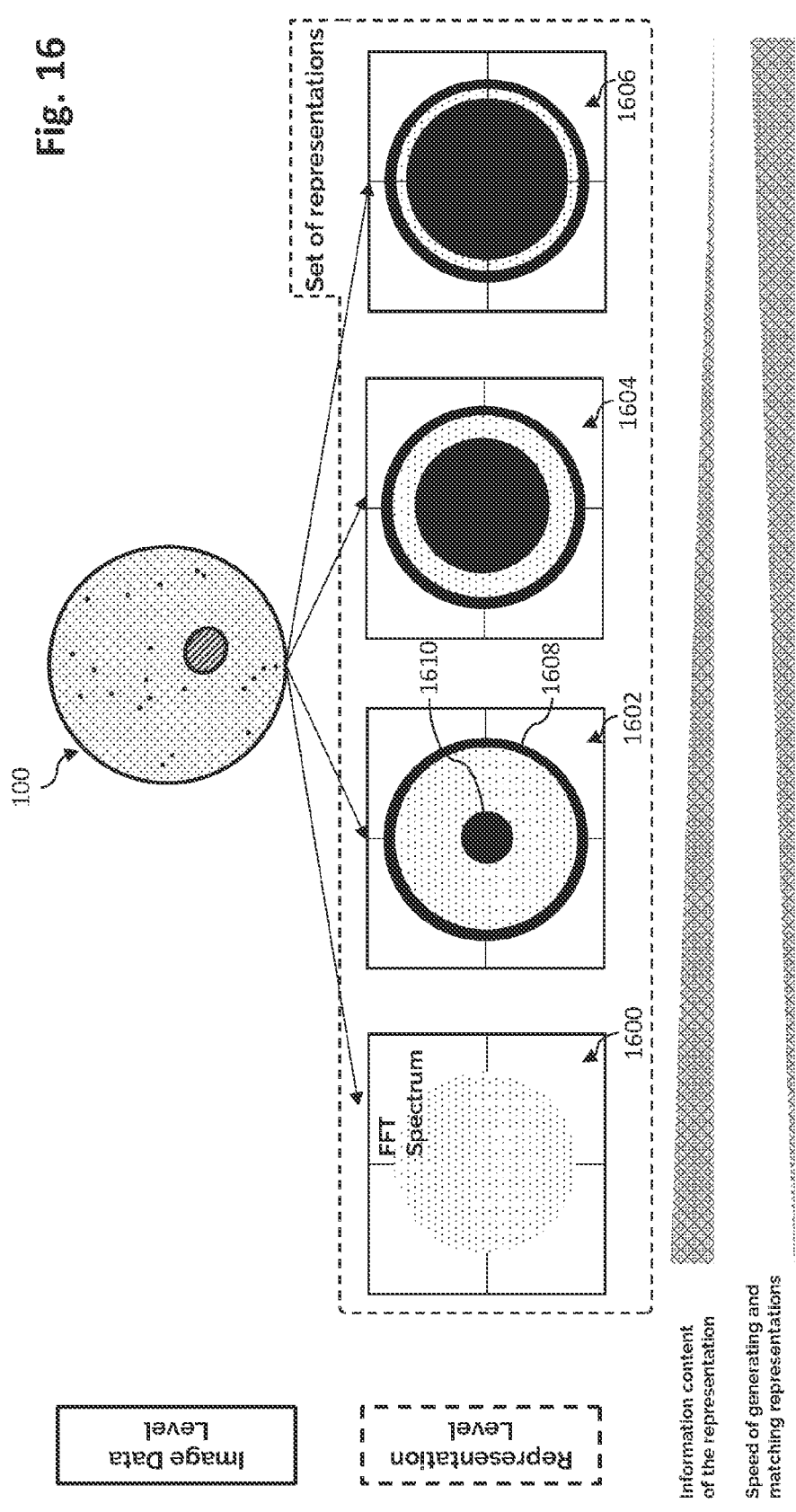
FIG. 16 schematically shows a set of representations of a given discrete entity from the frequency domain according to some embodiments.

FIG. 16 schematically shows a set of representations of a given discrete entity from the frequency domain. The set contains 4 FFT spectra 1600, 1602, 1604, 1606 that have different information content and are ordered from right to left starting with lowest information content on the right progressing to higher information content on the left. The respective spectra can be obtained for example by applying less or more stringent upper 1608 and lower 1610 cut-off frequencies which are shown in the Figure as solid black areas.

Figure 17:
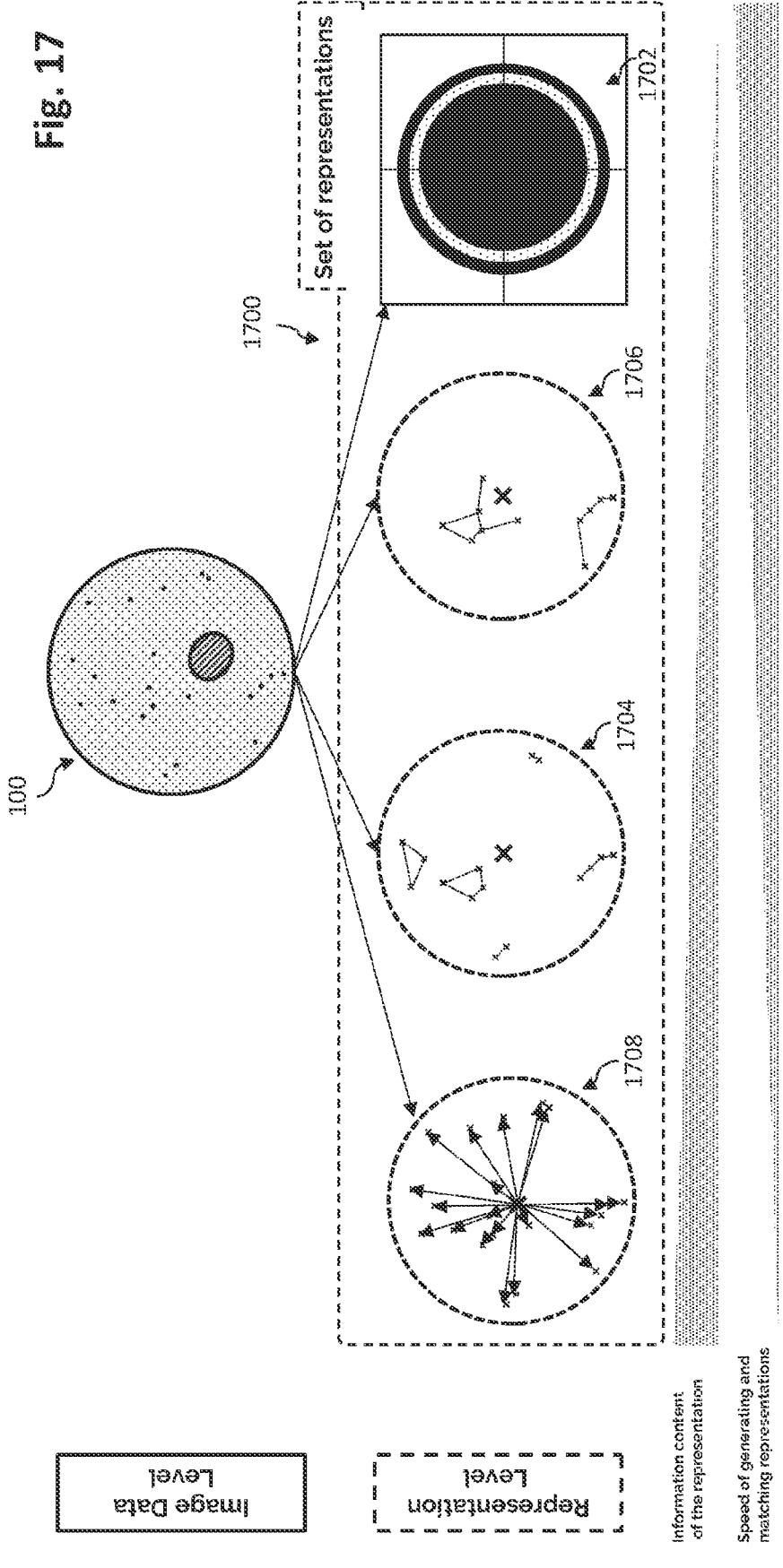
FIG. 17 shows a set of representations comprising an FFT spectrum, graph-based representations and vector-based representation, according to some embodiments.

Both vector-based, graph-based, mixed, spatial and frequency domain set of representations can be generated to represent the entirety of the marker or subsets thereof as schematically depicted in FIG. 17. For example, FIG. 17 shows the set of representations 1700 comprising an FFT spectrum 1702, two graph-based representations 1704, 1706 and a vector-based representation 1708 ordered from right to left starting with lowest information content on the right progressing to higher information content on the left.

Figure 18:
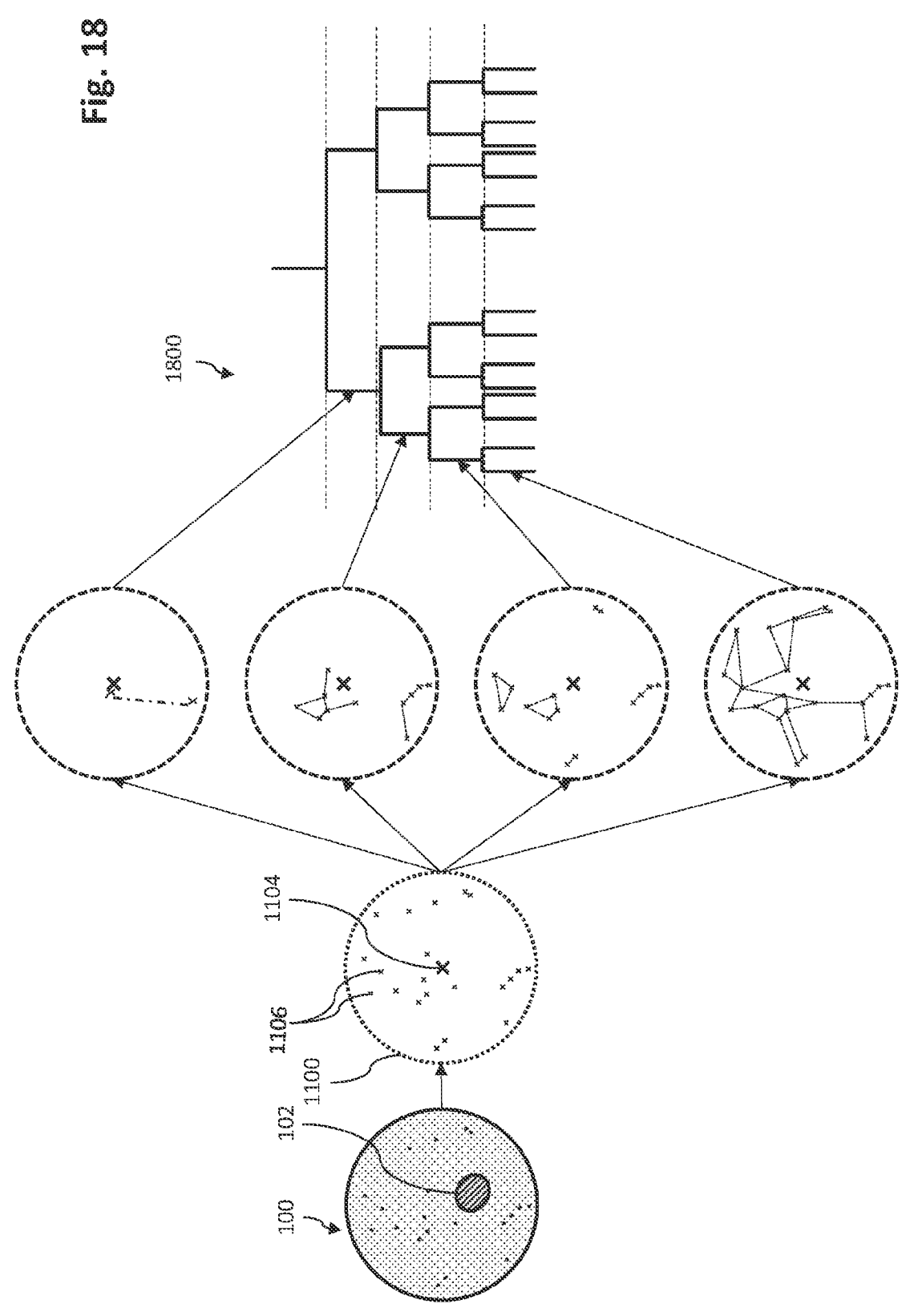
FIG. 18 illustrate multi-step matching strategies using hierarchal clusters according to some embodiments.
Figure 19:
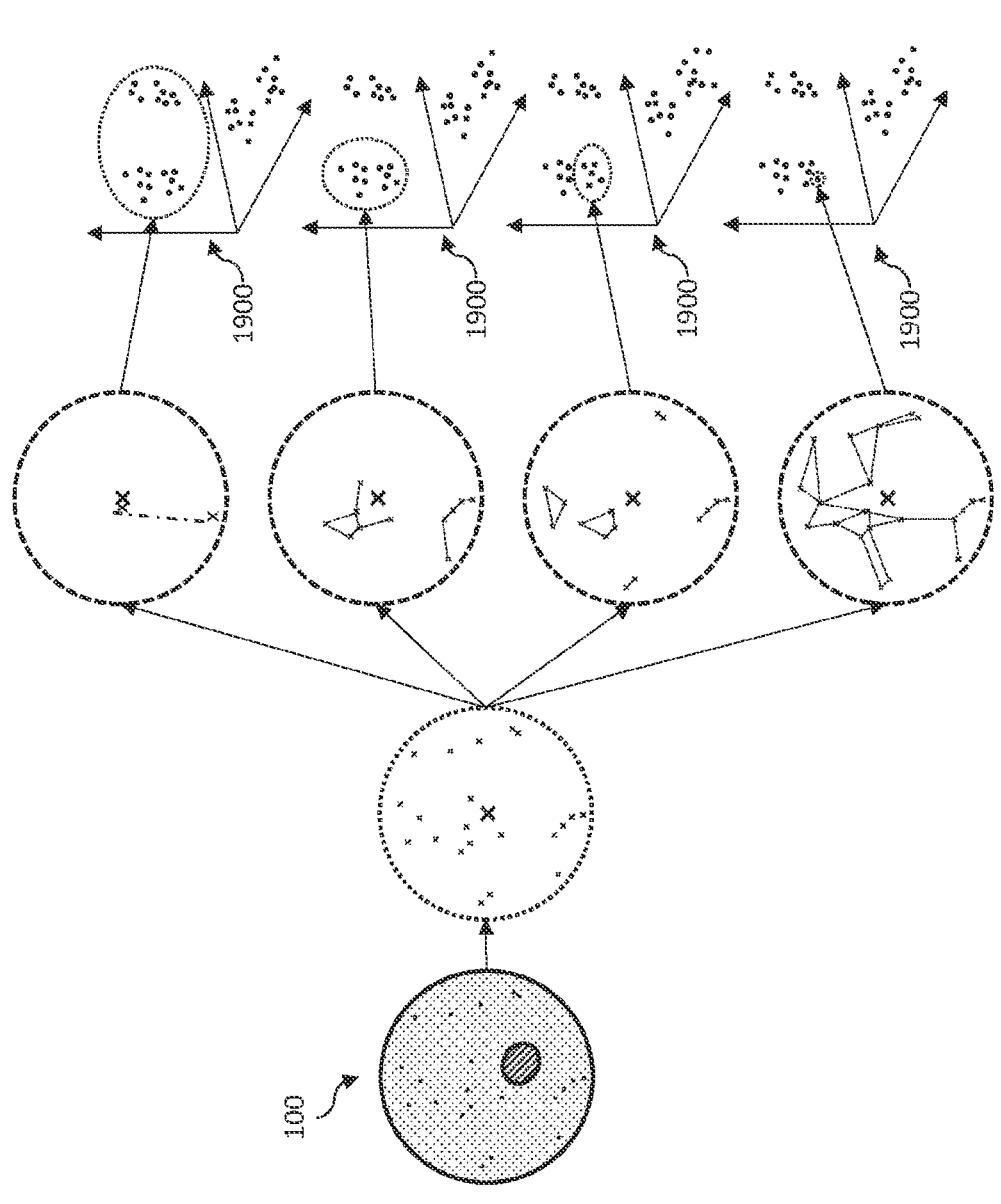
FIG. 19 illustrate multi-step matching strategies using principal component analysis according to some embodiments.
Figure 20:
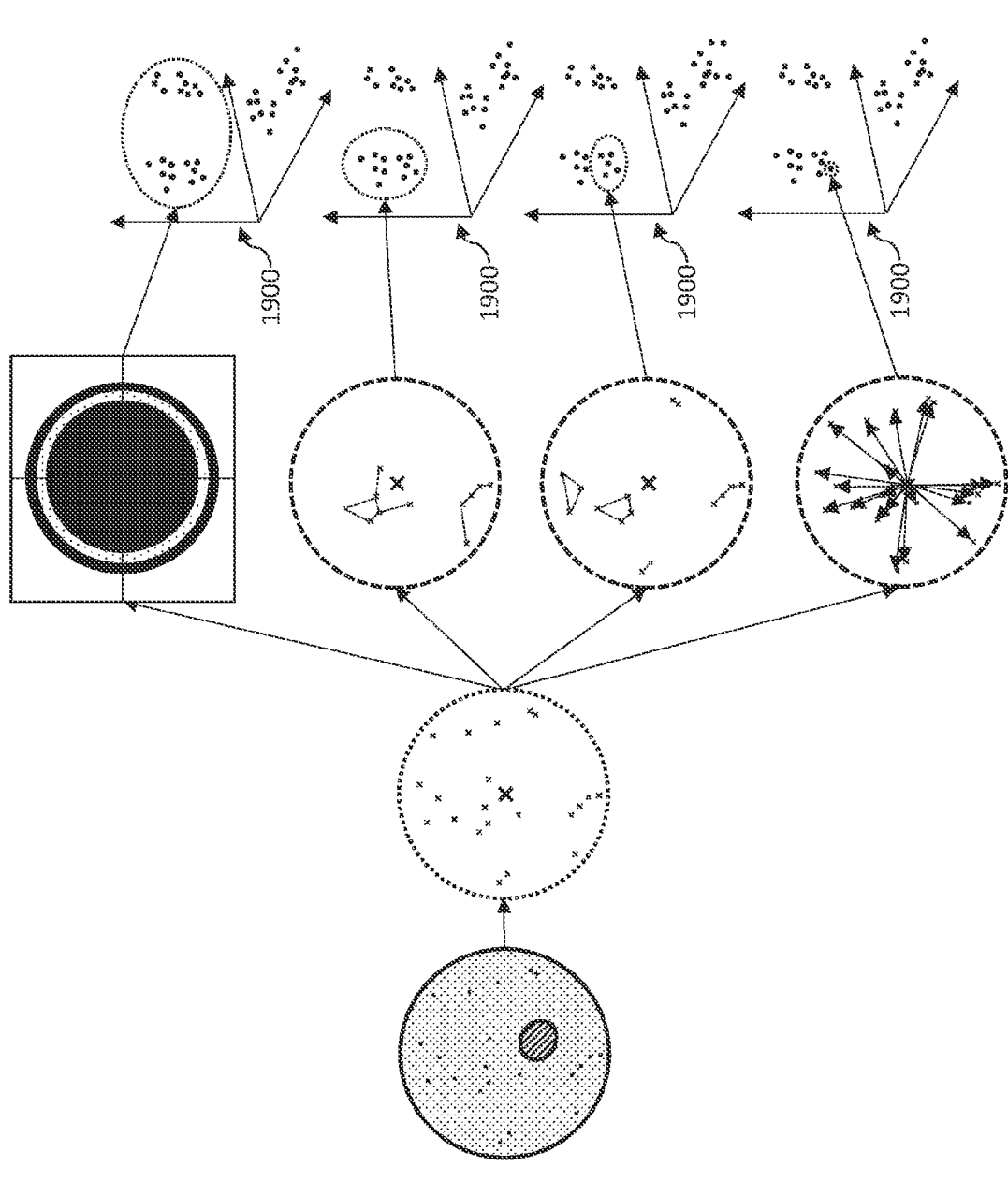
FIG. 20 illustrates multi-step matching strategies using principal component analysis according to some embodiments.

As described in this document sets of representations containing more than one representation allow the matching to proceed in a stepwise fashion starting with lower information content representations. FIGS. 18-20 schematically show the image data of a given discrete entity, the subset of features 1106 as well as center of mass 1104 of the hydrogel bead 100, its outer limitation 1100, and volume.

Further, FIGS. 18-20 show the sets of representations shown in FIGS. 15 and 17 and schematically illustrate how they can be used in stepwise comparisons to equivalent representations of other sets to progressively narrow down the set of possible matches, i.e. when a set of representations is compared to a set of previously acquired sets of representations a priori any of the previously recorded sets of representations may be the match. This can be represented as being on the root of a hierarchical cluster 1800 and is schematically depicted in FIG. 18. Using the multistep matching shown it is possible to quickly migrate down in the hierarchical cluster tree until the point where the similarity measure between a representation and a previously generated representation is higher than for any other pair and the matching exceeds a certain minimum level of statistical confidence.

Similarly, FIGS. 19 and 20 illustrate similar multi-step matching strategies using principal component analysis. The coordinate system 1900, in which each dimension represents a recognizable characteristic of the constituent parts of the markers, shows a plurality of dots with each dot corresponding to a set of representations from one hydrogel bead of the plurality of hydrogel beads. FIG. 19 illustrates how representations of increasing information content/granularity can be used to progressively narrow down the group of possible matches.

Hierarchical cluster analysis and principal component analysis are merely examples of statistical methods that can be used for matching and for the determination of statistical confidence other statistical methods may be at least equally suited for this purpose. In this way a pyramid-type set of representations of different levels of granularity can be generated and leveraged for a multi-step matching for each discrete entity that enables faster comparing and matching. Using this strategy, the performance of identification with respect to reliability and speed can be improved substantially.

Figure 21:
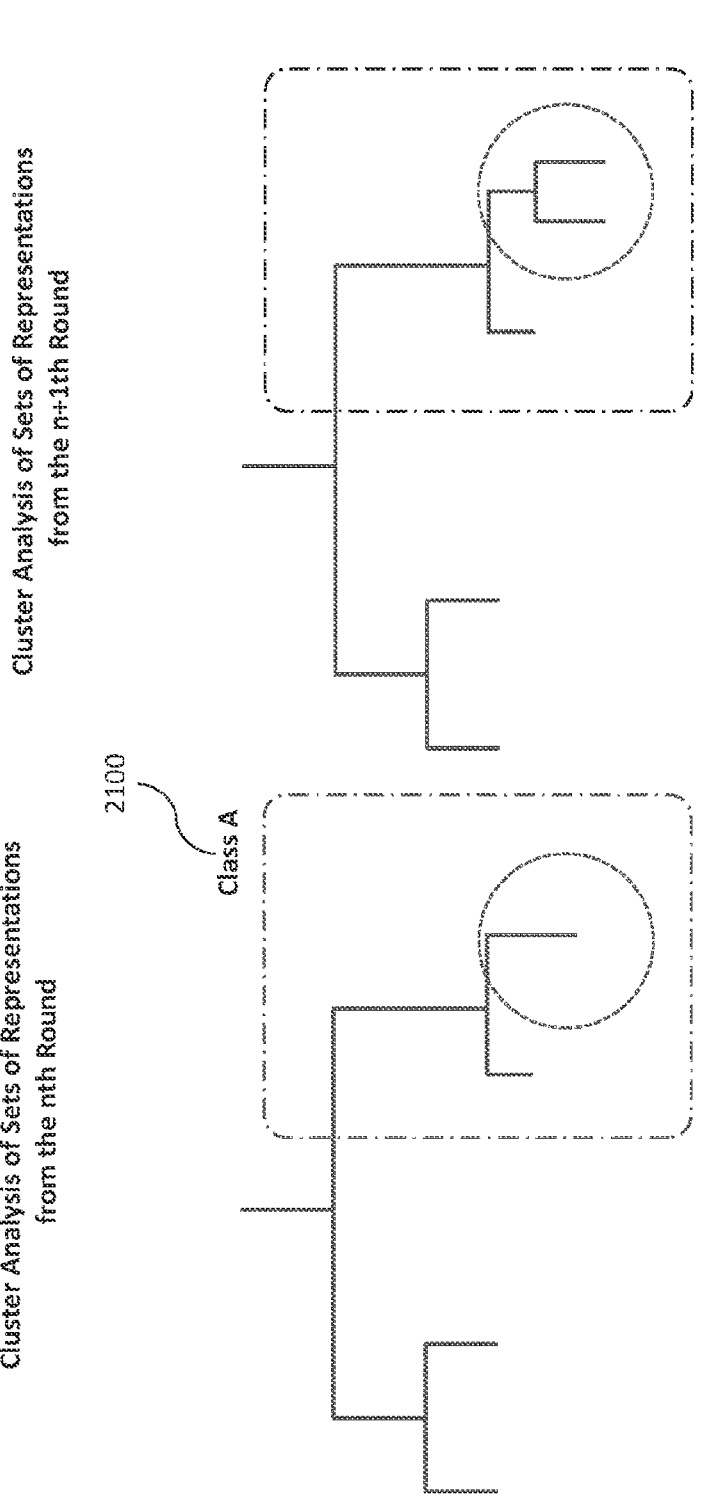
FIG. 21 shows multi-step matching strategies using classes and class labels according to some embodiments.

FIG. 21 shows a different approach to improve the speed of matching involving classes 2100 and class labels. Such class labels may be derived from basic parameters such as the number of features that make up the marker, the size of the microbeads, the color of the dye, the sequence of dyes in the case of a nanoruler or similar structure, the fluorescent life time, or a class label code in the case of lithographically generate markers. Class labels are advantageous, when entire subbranches of the plurality of the discrete entities shall be labelled as a member of certain class in the beginning of the experiment. This is useful when biological samples from multiple origins, such as for example biopsies from multiple patients or populations of cells that received different treatments, shall be cultivated, imaged, and analysed in a pooled fashion (pooled screens). In this case the user may for example incorporate microbeads of a certain colour A only with biological samples from donor A and all discrete entities carrying such samples will be assigned the class A 2100 such that when a set of representations of class A 2100 shall be matched all sets of representations which are not members of class A 2100 can be a priori excluded, which significantly reduces computational load.

Figure 22:
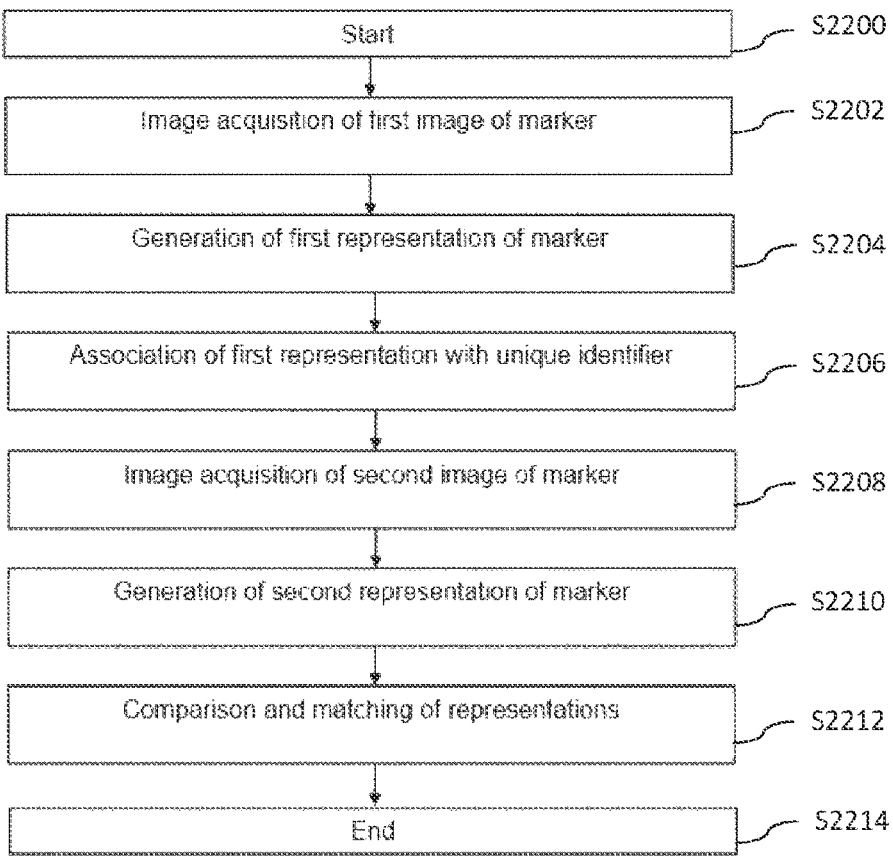
FIG. 22 shows a flow chart of a method for optically recognizing at least one hydrogel bead from a plurality of hydrogel beads according to some embodiments.

FIG. 22 is flow chart of a method for optically recognizing at least the hydrogel bead 100 from the plurality of hydrogel beads.

The method starts in a step S2200. In a step S2202, at least the hydrogel bead 100, in particular the marker of the hydrogel bead 100, from the plurality of hydrogel beads is imaged, e.g. by means of a microscope (first optical readout). The imaged hydrogel bead 100 represents a target hydrogel bead 100. The imaging may be carried out by applying various methods such as brightfield, phase contrast, confocal, or light-sheet microscopy techniques. In addition, computational approaches can be applied to the imaging data to extract image information, for example, phase or intensity information using a transport-of-intensity equation. Further, the generated image can be a threedimensional stack of images of the hydrogel bead 100.

Alternatively, the generated image can be single images, a plurality of images, a time series of images, or a set of three-dimensional stacks of images of the hydrogel bead 100 imaged from multiple angles or perspectives or views. The latter is advantageous as registration, fusion, and deconvolution of a sufficient number of views may lead to significant improvements in resolution and potentially lead to close-to isotropic resolution. The image data acquired in step S2202 might be stored on a storage device or in a database.

In a subsequent step S2204 a first set of representations of the marker is generated from the image data of the image generated in step S2202 and might be stored on a storage device or in a database. As described above, the set of representations may be a mathematical description of the marker, in particular, of the characteristics of the marker. For example, the set of representations comprises vectors describing the distance of the constituent parts of the marker to each other.

In a step S2206, the first set of representations is associated with a unique identifier and stored in a database. The unique identifier can be an index, a serial number, a random number, a name, or a code. More specifically, it can be a universally unique identifier, e.g. being unique irrespective of the experiment, instrument. The boundaries could be defined such as universally unique for all experiments performed on a given instrument, in a given institute, country, or globally. For a month, a year, or until forever. In a further alternative, the unique identifier can be generated based on the respective set of representations.

Usually, the steps S2202 to S2206 are repeated for a majority or all of the plurality of hydrogel beads 100, with a first set of representations generated and stored in the database for each of the respective hydrogel beads 100. Thus, the database comprises a first set of representations of each marker of the plurality of hydrogel beads, each marker associated with a unique identifier to easily identify each marker and the corresponding hydrogel bead 100. To this end, the imaging may be performed in a microfluidic flow cell, with hydrogel beads 100 flowing through the flow cell consecutively from a first container to a second container, such that each hydrogel bead 100 of the plurality is imaged by means of a microscope.

In a step S2208 one of the hydrogel beads 100 of the plurality is imaged by means of a microscope. In a step S2210 a second set of representations is generated from the image data of the image generated in step S2208. The resulting image data and/or the generated second set of representations can be stored on a storage device or in a database.

In a step S2212 the second set of representations generated in step S2210 is compared to the first set of representations generated and stored in step S2204 and step S2206, respectively. When the second set of representations of step S2212 matches the first set of representations of step S2204, the corresponding hydrogel bead 100 is recognized as the target hydrogel bead 100, such that the cell 102 can be identified or recognized.

In case that a plurality of representations is generated and stored in steps S2204 and S2206, the set of representations generated in step S2210 is sequentially compared to the representations stored in the database. When the set of representations of step S2210 is matched to a previously generated set of representations in the database, the corresponding hydrogel bead 100 is recognized as the target hydrogel bead 100.

Usually, when the steps S2202 to S2206 involve a majority or all of the plurality of hydrogel beads 100, as described above, the steps S2208 and S2212 are similarly repeated for a majority or all of the hydrogel beads 100. Thus, in steps S2208 and S2212 a second set of representations is generated for each of the hydrogel beads 100 being imaged and each set of representations is compared to the first set of representations of steps S2202 to S2206. As described above, the imaging in step S2208 can be performed in a microfluidic flow cell, with hydrogel beads 100 flowing through the flow cell consecutively from a first container to a second container such that each hydrogel bead 100 is imaged by means of a microscope. The method ends in a step S2214.

Figure 23:
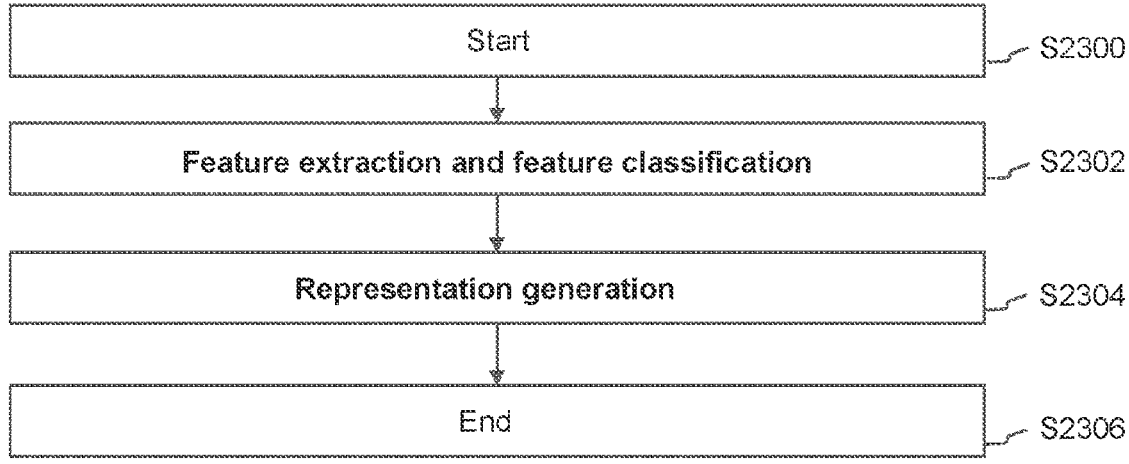
FIG. 23 shows a flow chart of a step of the method according to FIG. 22 for generating sets of representations, according to some embodiments.

FIG. 23 is a flow chart of step S2204 and S2210 of the method according to FIG. 22. The steps comprise generating a set of representations from the image data of the hydrogel bead 100.

The flow chart starts in a step S2300. In step S2302 image data of the hydrogel bead 100 is analysed to identify the constituent parts of the marker in the image data, for example, by means of a variety of feature detection methods including segmentation and filtering. The constituent parts of the marker may be identified by their keypoint features, edges, and interest points/feature points. Feature or interest points may be any detectable object, for example a microbead 104. A keypoint feature could be all the objects that have a certain neighbourhood for instance. For example, microbeads 104 may be segmented and their centre of mass determined.

The image segmentation analysis can be carried out with classical approaches, artificial intelligence based techniques including machine learning and neural-networks/deep learning, or other techniques including thresholding techniques, clustering methods, compression-based methods, histogram-based methods, edge detection, dual clustering method, region-growing methods, partial differentiation equation-based methods, variational methods, graph partitioning methods (for example Markov random fields), a watershed transformation, model-based segmentation, multi-scale segmentation, semi-automatic segmentation, trainable segmentation using various machine learning, neural network and artificial intelligence approaches for example pulse-coupled neural networks (PCNNs), and convolutional neural network (U-Net), recurring neural networks (RNNs) as well as object co-segmentation methods such as Markov networks, convolutional neural networks, or long short-term memory (LSTM), for example. Alternatively, or in addition, characteristics such as size and/or colour and/or fluorescent intensity and/or fluorescent lifetime can be used to identify the constituent parts of the marker from the image data. Various algorithms can be used for identification including Harris Corner, scale invariant feature transform (SIFT), speeded up robust feature (SURF), features from accelerated segment test (FAST), and oriented FAST and rotated BRIEF (ORB) are known and can be used to identify the constituent parts and/or features of the marker from the image data.

In a step S2304, the constituent parts and/or features of the marker identified in step S2302 are then further analysed to generate set of representations of the marker, for example, by finding the centre of mass for each constituent of the marker and/or the discrete entities and representing each centre of mass in the spatial domain by a set of vectors 1108 originating from a reference point or multiple reference points (FIG. 11) or by a graph 1110 (FIG. 11) and/or in the frequency domain by Fourier analysis. Thus, the set of representations can be generated in the frequency domain or in the spatial domain. Further, the set of representations can be generated in both, the frequency domain and the spatial domain. In addition, the set of representations can include information on the characteristics of the constituent parts of the marker.

Thus, the set of representations comprises the characteristics of the marker, in particular, spatial information, such as the distance between the centre of neighbouring constituent parts of the marker. In addition, each marker and the respective set of representations can be classified based on the characteristics of the marker (FIG. 21), for example, they can be classified by the number of constituent parts. The flow chart ends in a step S2306.

Figure 24:
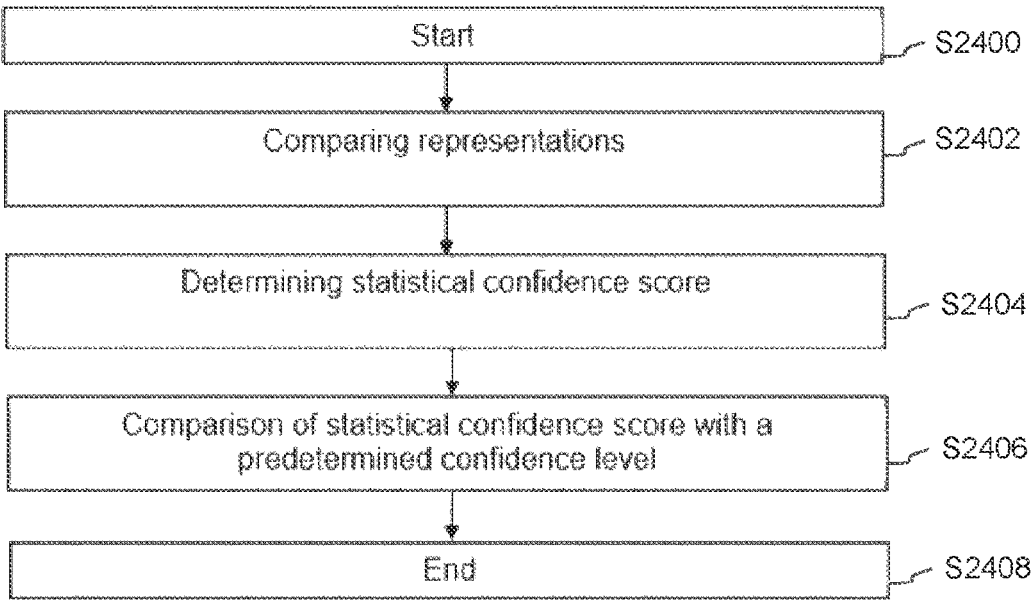
FIG. 24 is a flow chart of a step of the method according to FIG. 22 for comparing and matching one set of representations to another set of representations, according to some embodiments.

FIG. 24 is a flow chart of step S2212 of the method according to FIG. 22. This step comprises comparing the second set of representations to the first set of representations and matching them.

The flow chart starts in step S2400. In step S2402, the second set of representations is compared to at least the first set of representations. As described above, the second set of representations is usually compared to a database of first set of representations. The comparison is done, for example, by cluster analysis. In case the set of representations of the comparison are classified based on the characteristics of the marker, the classification of each set of representations can be used to only compare set of representations with the same classification. This accelerates the comparison of the set of representations.

In a step S2404, a statistical confidence score is determined based on the cluster analysis of step S2402. The statistical confidence score describes the probability of two particular sets of representations being the same. Thus, for each pair of first and second set of representations a statistical confidence score can be calculated based on the probability of the set of representations of the pair being set of representations of the same discrete entity.

In a step S2406, the second set of representations is matched to the first set of representations depending on a comparison of the statistical confidence score of step S2404 to a predetermined confidence level. In the case that the second set of representations matches the first set of representations, the corresponding hydrogel bead 100 is recognized as the target hydrogel bead 100. The flow chart ends in a step S2408.

Figure 25:
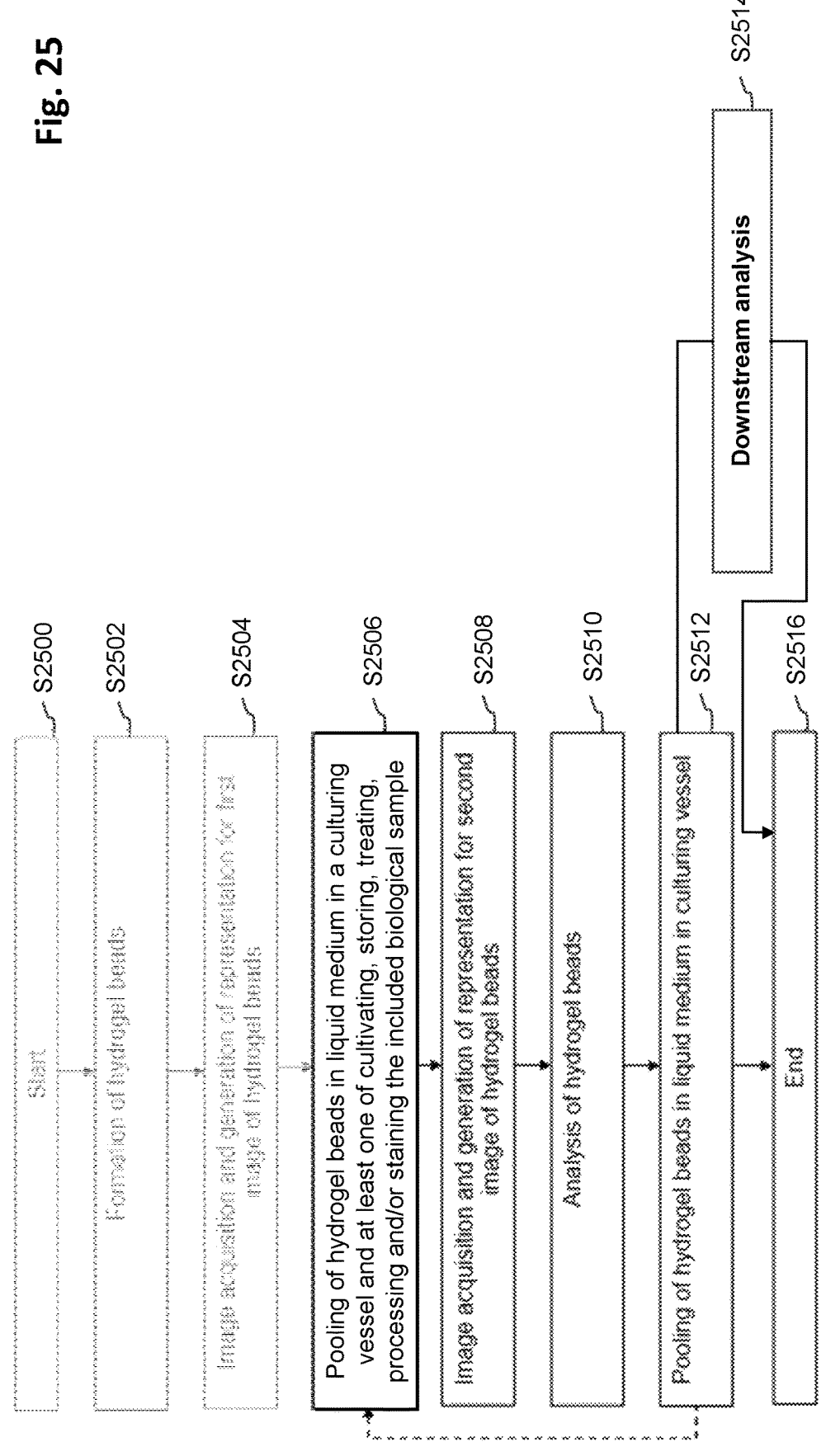
FIG. 25 is a flow chart of a workflow integrating the method according to FIG. 22, according to some embodiments.

FIG. 25 is a flow chart of a workflow integrating the method according to FIG. 22. The workflow starts in a step S2500. In step S2502, the hydrogel beads 100 are formed as described above for FIG. 3 by microfluidics or by an alternative route including emulsification, 3D bioprinting, lithographic formation, electro-spray. The hydrogel beads 100 each comprise at least a cell 102 and a marker, for example, a plurality of microbeads 104. Alternatively, the step S2502 may comprise the formation of the hydrogel beads 100 and the subsequent generation of markers by photolithography, as described above for FIG. 7, 8, 9.

In a subsequent step S2504, each hydrogel bead 100, and preferably the cell 102 contained by the hydrogel bead 100 as well, is initially imaged and based on the image data, the first set of representations is generated and associated with the respective hydrogel bead 100, as described for FIG. 11. In case that a first set of representations is generated that is similar to a previously generated first set of representations and that these set of representations cannot be distinguished, the corresponding hydrogel beads 100 can be removed from the plurality of hydrogel beads. The same might be done if a hydrogel bead has no biological sample or cell or has a content that should be excluded from the analysis or experiment.

In a step S2506, the hydrogel beads 100 are pooled and suspended in a liquid medium, for example, to be cultured in suspension in a culture vessel for a period of time and/or to be subject to treatment (e.g. through application of at least one of, small molecule compound, a biologic, a nucleic acid, a protein, a secreted protein, a growth factor, a signalling molecule, a cytokine, a neurotransmitter, a hormone, an antigen, an antibody, a virus, a bacterium, an agent to knockdown gene expression like RNAi constructs, CRISPR/CAS), and/or to process the embedded biological sample (e.g. at least one of fixation, permeabilization, hydration, dehydration, clearing, expansion), and/or to stain the embedded biological sample to perform a cell-based assay (e.g. at least one of histological stains, dyes, fluorescent labels, direct and indirect immunofluorescence, multiplex immunofluorescence, fluorescent in situ hybridization).

In a step S2508, some or each hydrogel bead 100 is removed from the culture vessel and imaged, for example, in a microfluidic flow cell. Based on the image data, the second set of representations is generated, compared and matched to one of the first set of representations, as described for FIGS. 15 to 21.

In a next step S2510 the hydrogel beads 100 are each further analysed, for example, the cell in each hydrogel bead 100 is imaged. Any further data gathered for a particular hydrogel bead 100 is associated with the unique identifier of the set of representations of that hydrogel bead 100. This allows the tracking of data associated with any particular hydrogel bead 100.

In addition or alternatively, the hydrogel beads 100 may be sorted into several groups of hydrogel beads 100 or individual hydrogel beads, for example, based on the further data gathered.

In a next step S2512, the hydrogel beads 100 are then returned to the culture vessel, for example, to be further cultured. In case the hydrogel beads 100 were sorted in the previous step S2510, the sorted groups of hydrogel beads 100 or individual hydrogel beads may be routed into several separate culture vessels such as a spinner flask or a microwell plate.

In an alternative step S2514, a particular group of the sorted hydrogel beads may be subjected to further downstream analysis. This can include but is not limited to genomics, transcriptomics, chromatin immunoprecitation sequencing (ChIP-Seq), proteomics and metabolomics analysis of the sample contained in each hydrogel bead. Since each sample is contained in a separate hydrogel bead and the hydrogel beads can be individually recognized and sorted, the downstream analysis can be carried out on single samples. Thus, the data gathered from these downstream analyses can be linked to that single sample and therefore linked to any other data that has been linked to that single sample over the course of an experiment.

In a further alternative to step S2514, a particular group of the sorted hydrogel beads may be subjected to disintegration and release of the included biological sample for further cultivation and use. This includes the use of identified cells for bioprocessing or therapeutic applications. In particular this includes the use of isolated cells or populations of cells as cell therapeutic agents.

In a further alternative to step S2514, a particular group of the sorted hydrogel beads includes immune cells reactive to a given antigen including for example a tumor neoantigen and is disintegration and release of the included biological sample, which may be then subject to further expansion in cell culture and/or cloning of the corresponding T-cell or B-cell receptors.

In a further alternative to step S2514, a particular group of the sorted hydrogel beads may be subjected to disintegration and release of the included biological sample, which is a T-cell reactive against a tumor neoantigen, which may be subject to further expansion and/or cloning of the corresponding T-cell receptor.

The workflow ends in a step S2516.

Alternatively, as indicated by the dashed line, the steps S2506 to S2512 may be repeated over several iterations. With each iteration, the hydrogel beads 100 can be imaged, further data gathered, and associated with the corresponding hydrogel bead 100. Thus, at each iteration, any one hydrogel bead 100 can be identified based on a previously generated first set of representations. This allows tracking of any particular hydrogel bead 100 as it is cultured in suspension culture at particular timepoints over a period of time. In particular this allows the tracking of the biological samples, for example single cells 102 and/or organoids and/or tumoroids, within any particular hydrogel bead 100 over the course of the culturing, for example, to track changes in the cells 102 or the biological sample and responses to various kinds of stimuli. Further, with each iteration, individual hydrogel beads or groups of hydrogel beads may be sorted and removed from the plurality of hydrogel beads in step S2510 and subjected to downstream analysis in step S2514.

Such experimental stimuli are also referred to as pulses or treatments and may include chemical compounds, biologics, DNA, RNA, proteins, antibodies, antibody-fragments, aptamers, mechanical, electrical, photophysical stimuli, wounding, scratching, ablation, photoablation, temperature changes, changes to physiological conditions (pH, $O_2$, $CO_2$, $N_2$ concentrations) the addition of further cell types, bacteria, archea, fungi, multicellular eukaryotes, parasites, animals, and plants.

In this way embodiments of the present invention can enable a huge variety of workflows including cell-based assays that are based on scaffold-based suspension 3D cell culture and iterative identification of discrete entities (i-iDE) workflows. The main advantage of basing such assays on this i-iDE platform is related to the fact that hydrogel beads lend themselves very well as discrete entities or sample containers both for a particular advantageous type of cell culture which is likewise disclosed herein, as well as to imaging in flow-through mode. Workflows based on the i-iDE platform are compatible with a wide variety of sample types including but not limited to single cell, clusters of cells, co-cultures of cells, spheroids, tumoroids, organoids, assembloids, and tissue biopsies.

They allow ultra-high throughput data capture and lend themselves easily to multiview imaging using various microscopic, in particular widefield, spinning disk, and/or light sheet fluorescence microscope implementations. Discrete entities and the biological samples they contain may not only be imaged and cultivated in this way, but they may also be sorted (step S2510) based on such analysis and subjected to various downstream analyses (step S2514) including but not limited to multi-omics for example transcriptomics, genomics, ChIP seq, and metabolomics.

The encapsulation of samples in hydrogel beads overcomes disadvantages of the prior art, which is based on imaging non-encapsulated samples in flow cells.

Figure 26:
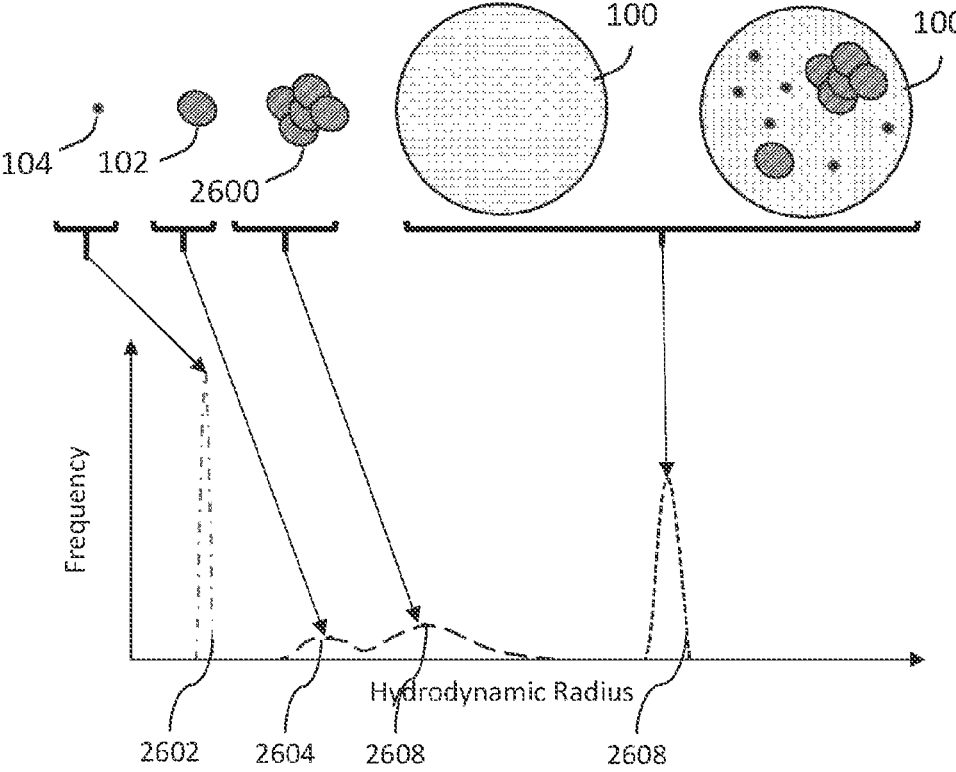
FIG. 26 shows schematically various objects and their distribution relating to hydrodynamic radius, according to some embodiments.

FIG. 26 schematically shows various objects and their distribution relating to hydrodynamic radius. Individual objects, such as microbeads 104, cells 102, cell clusters/organoids 2600 and hydrogel beads 100, all have different sizes and different hydrodynamic radii 2602, 2604, 2606, 2608 that affect their movement and diffusion in a liquid, in particular when they are suspended. For example, microbeads have a small hydrodynamic radius with only small deviations, whereas cells or cells clusters have a successively larger hydrodynamic radii that also show larger deviations. In contrast, encapsulation or embedding into similar hydrogel beads turns a non-uniform (polydisperse) mix of smaller and larger objects like microbeads 104 and other small particles, single cells 102 and cell clusters/organoid 2600 into a uniform (monodisperse) set of objects. This uniformity leads to a much better defined and controlled flow through a flow cell. In terms of the optical properties a more uniform flow is advantageous as it precludes the formation of whirls inside the flow cell, that may result from multiple objects of different hydrodynamic radii passing through the flow cell at different velocities at the same time. Similarly, when larger and smaller objects pass through the flow cell at the same time they may cast shadows on each other leading to the formation of stripe artefacts. While encapsulation might not solve this problem completely, it is expected to alleviated it, as it leads to a more homogeneous distribution of arrival of objects in the flow cell.

Figure 27:
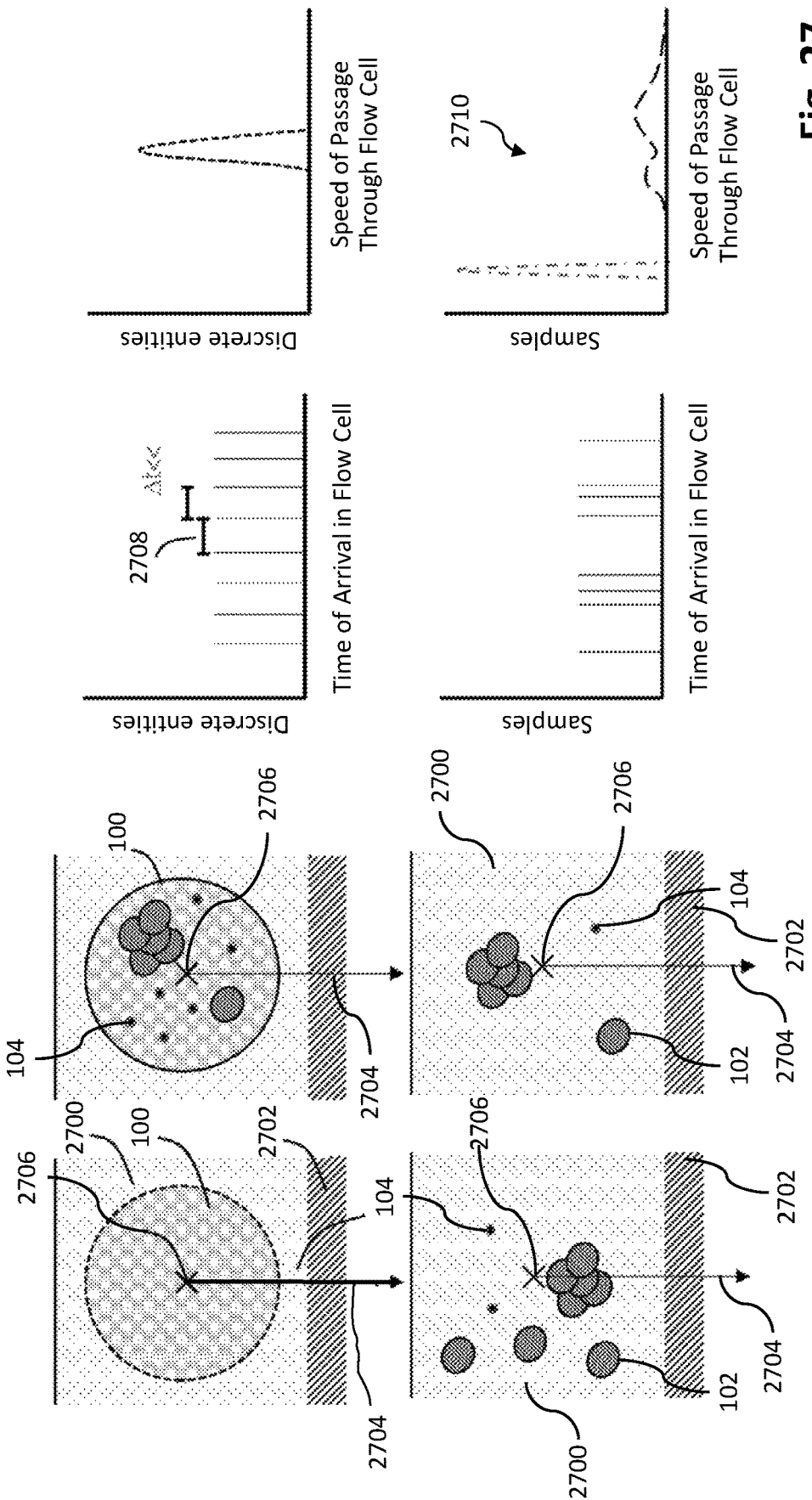
FIG. 27 is a schematic view of hydrogel beads and smaller objects in a flow cell according to some embodiments.

FIG. 27 is a schematic view of hydrogel beads 100 and smaller objects in a flow cell 2700. A flow cell typically consists of an upper part where the analyte enters the flow cell and downstream part where the analyte exits the flow cell. These parts are not shown in the FIG. 27. Typically, the flow cell 2700 has a central part (shown in FIG. 27) that contains a window 2702 through which the analyte can be analysed. Schematic drawings of the central part of a flow cell are shown. On the top left are two drawings that represent a case, in which the hydrogel bead 100 is in the flow cell 2700, in particular with the biological sample 102 and the marker included in the hydrogel bead 100. Bottom left are two drawings that represent a case, in which analytes such as cells, clusters of cells and smaller particles are not included in a hydrogel bead. Further the drawing shows a light ray 2704 emanating from the centre 2706 of the flow cell. On the right are diagrams, schematically illustrating the time of arrival in the flow cell of the analytes and their speed of passage through the flow cell.

For example, the uniformity of hydrogel beads leads to a more uniform flow of hydrogel beads through the flow cell. In particular, the velocity of uniform objects through the flow is equally uniform. A uniform flow allows the 3D imaging of samples passing through the flow cell using temporally equidistant acquisitions 2708, i.e. the time difference $\Delta t$ in the intervals of arrival is small. This means that hydrogel beads of a similar hydrodynamic radius are flowing through the flow cell with a similar velocity. In contrast, objects of a wider range of hydrodynamic radii or with entirely different hydrodynamic radii, such as microbeads, cells and clusters of cells, flow through the flow cell with different velocities 2710. Similarly, in the case of a single shot acquisition per hydrogel bead, a more uniform flow allows to better predict, when the centre of mass of the hydrogel bead, will arrive at the centre of the flow cell or in the field of view of the imaging system or the microscope. A simple optical detection unit, e.g. a light barrier, in front of the main flow cell can be used to detect hydrogel beads and to measure their velocity and to predict their arrival in the main flow cell with high accuracy. In this way, image acquisition can be synchronized and image registration, and image correction can be run with ideal parameters.

In an embodiment the methods and devices described herein can be used to perform cytokine profiling of single cells, in particular this relates to cytokine profiling of immune cells.

Figure 28:
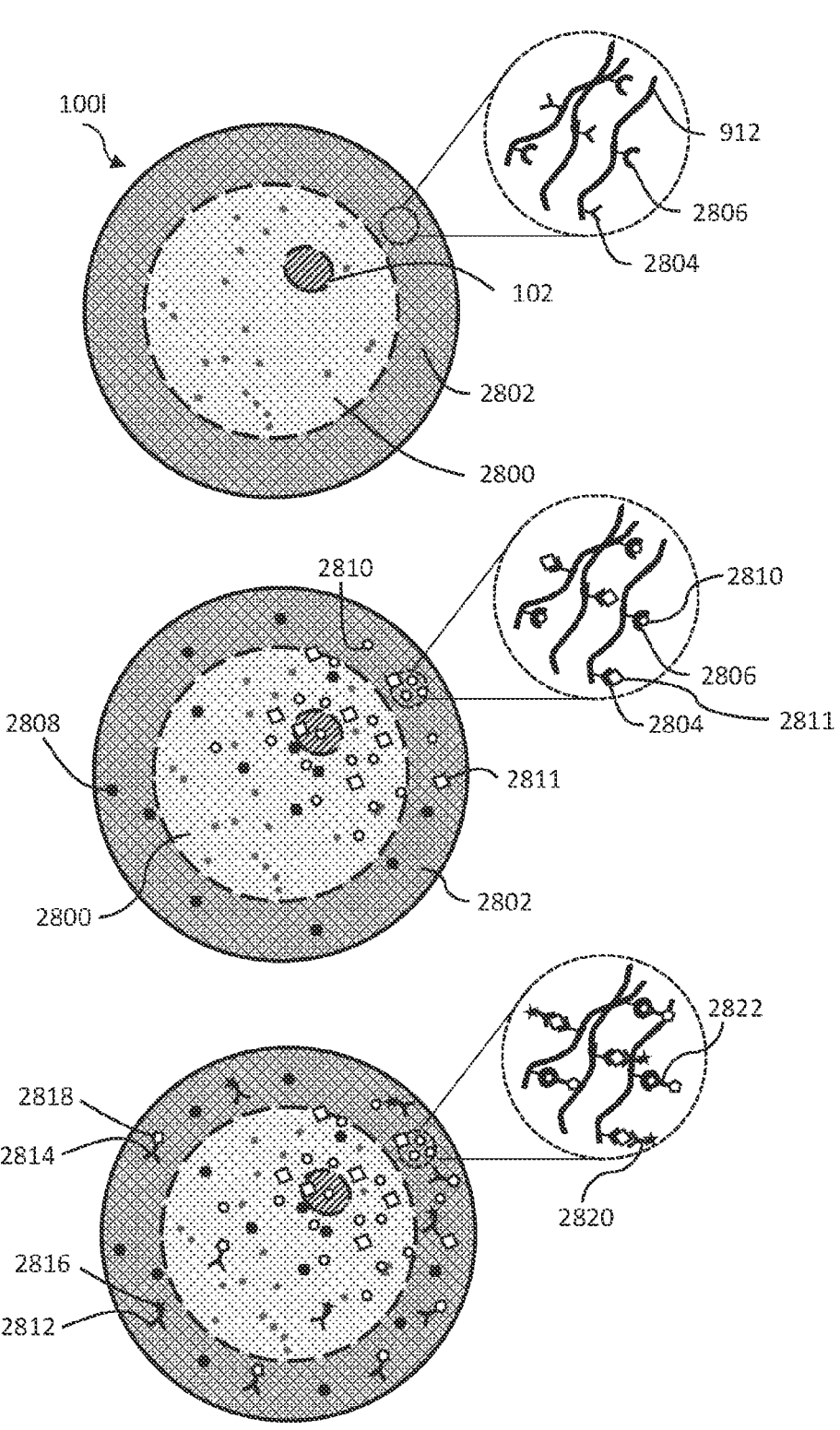
FIG. 28 shows schematically a hydrogel bead with a sample for cytokine profiling according to some embodiments.

FIG. 28 schematically shows a hydrogel bead with a sample for cytokine profiling. The single cell 102, for example a single immune cell, is encapsulated or embedded in a hydrogel bead 100/ that comprises a section/layer 2800 used for cultivation of the single cell 102 and at least one section/layer 2802 used as a reporter layer, configured to capture one or more cytokines and other molecules secreted by the cell by means of capture reagents 2804, 2806 that are covalently bound to the hydrogel polymer 912. Upon stimulation with a stimulus 2808, for example a tumor neoantigen, a peptide, an antigen, another cell type, a pathogen, or a physical stimulus, a subset of the encapsulated immune cells reactive to the particular stimulus may secrete molecules including various cytokines 2810, 2811. As these secreted molecules diffuse from the cell through the cultivation hydrogel layer, they reach the reporter layer, where they bind to suitable affinity reagents such as antibodies, nanobodies, or aptamers 2804, 2806. Using labelled affinity reagents 2812, 2814, for example fluorophore-coupled 2816, 2818 antibodies reactive against the cytokines 2810, 2811, the binding of the cytokines to the capture reagents 2804, 2806 can be optically detected. Following to a step in which unbound labelled affinity reagents 2812, 2814 are washed out, the remaining bound labelled affinity reagent 2820, 2822 selectively marks region in which the respective captured cytokines 2810, 2811 are bound by the labelled affinity reagents.

Figure 29:
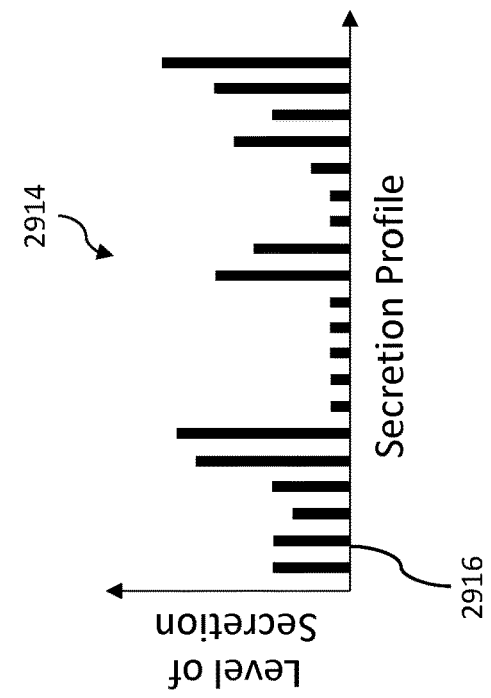
FIG. 29 shows schematically a further hydrogel bead with a sample for cytokine profiling according to some embodiments.
Figure 29:
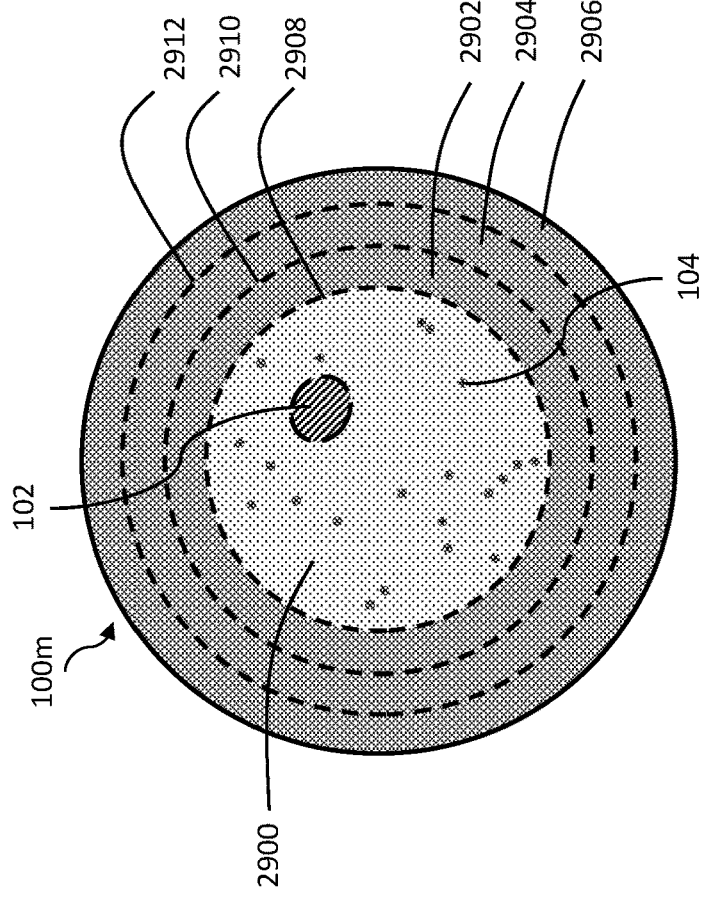

FIG. 29 shows a further hydrogel bead 100m with a sample 102 for cytokine profiling. The hydrogel bead 100m comprises multiple sections/layers with at least on section/layer 2900 for cultivation and a plurality of reporter layers 2902, 2904, 2906. At each interface 2908, 2910, 2912 between the sections/layers a thin layer of at least one (different) fluorescent dye is arranged and used to identify individual reporter layers 2902, 2904, 2906. Each reporter layer 2902, 2904, 2906 is configured to analyse a different set of cytokines. This allows determining a cytokine profile 2914 for a range of cytokines 2916 of interest for each single cell encapsulated in the plurality of hydrogel beads. The number, sequence and sizes of the layers 2902, 2904, 2906 may be flexibly varied depending on the needs of the respective application. For example, depending on the number of different cytokines 2916 to be measured. It is an advantage of this format that the resulting profiles are true secretion profiles 2916, i.e. they measure actually secreted proteins, as opposed to expression profiles, which measure expression on the level of RNA or detect intracellular protein and thus cannot yield conclusions about the extent to which a certain protein is actually secreted for principle reasons.

The same method described for FIGS. 28 and 29 can be used to analyse any kind of secreted molecule and perform secretome profiling.

In addition the same method may be used to detect intracellular molecules including but not limited to DNA, RNA, proteins, neurotransmitters, hormones, and metabolites following to lysis of the cells.

Further the method may be used to capture a set of nucleic acids and analyse single nucleotide polymorphisms following to lysis of the cells using suitable capture and detection reagents.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Figure 30:
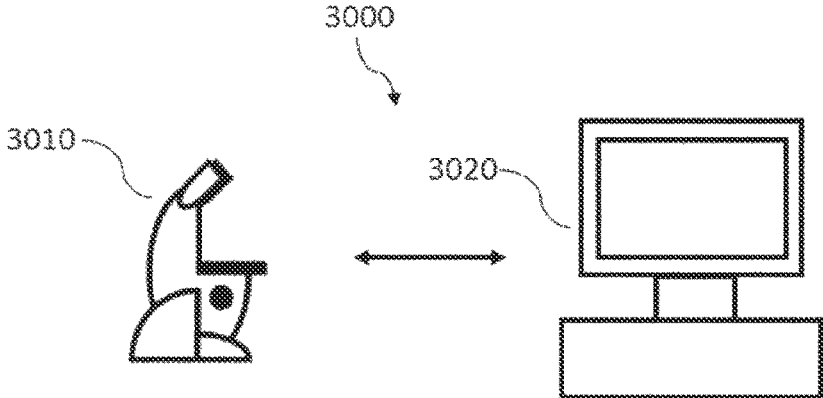
FIG. 30 shows a microscope and a computer system according to some embodiments.

Some embodiments relate to a microscope comprising a system as described in connection with one or more of the FIGS. 1 to 29. Alternatively, a microscope may be part of or connected to a system as described in connection with one or more of the FIGS. 1 to 29. FIG. 30 shows a schematic illustration of a system 3000 configured to perform a method described herein. The system 3000 comprises a microscope 3010 and a computer system 3020. The microscope 3010 could e.g. be used for generating an optical read-out of a marker and is configured to take images and is connected to the computer system 3020. The computer system 3020 is configured to execute at least a part of a method described herein. The computer system 3020 may be configured to execute a machine learning algorithm. The computer system 3020 and microscope 3010 may be separate entities but can also be integrated together in one common housing. The computer system 3020 may be part of a central processing system of the microscope 3010 and/or the computer system 3020 may be part of a subcomponent of the microscope 3010, such as a sensor, an actor, a camera or an illumination unit, etc. of the microscope 3010.

The computer system 3020 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 3020 may comprise any circuit or combination of circuits. In one embodiment, the computer system 3020 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system X20 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system X20 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system X20 may also include a display device, one or more speakers, and a keyboard and/or controller, which can include a mouse, trackball, touch screen, voice-recognition device, or any other device that permits a system user to input information into and receive information from the computer system X20.

Some or all of the method steps may be executed by (or using) a hardware apparatus, like for example, a processor, a microprocessor, a programmable computer or an electronic circuit. In some embodiments, some one or more of the method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100, 100*a* to 100*m* Hydrogel bead
102 Cell, biological sample
104, 504, 506, 512, 514, 516 Microbead
200, 202, 204, 2800, 2802, 2900, 2902, 2904, 2906 Section of hydrogel bead
300 Microfluidic device
302 Non-polymerised hydrogel
400, 402, 800, 802, 804, 806, 916 Marker
404 Continuous phase or intensity object
406, 408 Surface of hydrogel bead
500, 508, 518, 1000, 1900 Coordinate system
600 Nanoruler
602 DNA
604, 606, 908 Dye
608 Vector
610, 612, 1108, 1110, 1500, 1502, 1504, 1506, 1704, 1706, 1708 Representations
700 Photolithographic device
702 Flask
704, 2700 Flow cell
900 Negative
902 Protected binding site
904 Unprotected binding site
906 Positive
910 Unbound dye
912 Hydrogel polymer
914 Covalently bound dye molecule
1100 Limit of hydrogel bead
1102 Segmented hydrogel bead
10731-01-P-WO 04.05.2021
1104 Centre of mass

1106 Subset of features
1200 Substeps of feature extraction
1202 Image processing pipeline
1300 Feature classification pipeline
1400 Representation pipeline
1402 Representation generation method
1404, 1700 Set of representations
1600, 1602, 1604, 1606, 1702 Fast Fourier transform spectra
1800 Hierarchical cluster
2100 Class
2600 Cell cluster
2602, 2604, 2606, 2608 Hydrodynamic radius
2702 Window
2704 Light ray
2706 Centre of flow cell
2708 Time of arrival in flow cell
2710 Speed of passage through flow cell
2804, 2806 Capture reagent
2808 Stimulus
2810, 2811, 2916 Cytokine
2812, 2814 Labelled affinity reagent
2816, 2818 Fluorophore
2820, 2822 Bound labelled affinity reagent
2908, 2910, 2912 Interface between sections
2914 Cytokine profile

The invention claimed is:

1. A method for optically recognizing at least one target discrete entity from a plurality of discrete entities in a liquid, each discrete entity comprising a biological sample and a marker, the method comprising:

acquiring a first optical read-out of the marker of a first discrete entity from the plurality of discrete entities, the first discrete entity defining the target discrete entity, generating a first set of representations of the marker of the first discrete entity based on the first optical read-out of the marker of the first discrete entity and associating the first set of representations with the target discrete entity, acquiring a second optical read-out of the marker of at least one discrete entity from the plurality of discrete entities, generating a second set of representations of the marker of the at least one discrete entity based on the second optical read-out of the marker of the at least one discrete entity, comparing the second set of representations to the first set of representations, wherein each of the first set of representations and the second set of representations comprises a set of representations of the marker with progressively more information content, and wherein the comparing the second set of representations to the first set of representations comprises stepwise comparisons of equivalent representations of the first set and the second set to progressively more information content, and recognizing the at least one discrete entity of the second optical read-out as the target discrete entity, upon determining that, at certain level of information content, a similarity measure between the second set of representations and the first set of representations exceeds a minimum level of statistical confidence.

2. The method according to claim 1, wherein each discrete entity comprises polymeric compounds.

3. The method according to claim 1, wherein each marker comprises at least one of a luminescent, fluorescent or phosphorescent microbead, a non-fluorescent microbead, a luminescent nanoruler, or a dye.

4. The method according to claim 1, wherein each marker comprises at least one element, which has a directional component.

5. The method according to claim 1, wherein each biological sample comprises at least one cell.

6. The method according to claim 1, wherein each marker is generated using photolithography, wherein each marker is a three-dimensional pattern.

7. The method according to claim 1, wherein each marker is generated during formation of the respective discrete entity.

8. The method according to claim 1, wherein each of the first optical readout and the second optical readout comprises a single image, a plurality of images, a stack of images, or a time series of images.

9. The method according to claim 1, wherein each of the first set of representations and the second set of representations comprises at least one of image data resulting from a respective optical read-out, information about the marker, or information of at least one constituent part of the marker, and/or wherein each of the first set of representations and the second set of representations is generated by image segmentation analysis of the respective optical read-out.

10. The method according to claim 1, wherein each of the first set of representations and the second set of representations is generated based on spatial and/or physical characteristics of the respective marker or a part of the respective marker.

11. The method according to claim 1, wherein each of the first set of representations and the second set of representations is generated in the spatial domain.

12. The method according to claim 1, wherein each of the first set of representations and the second set of representations is generated in the frequency domain.

13. The method according to claim 1, wherein each of the first set of representations and the second set of representations is classified based on spatial and/or physical characteristics of the respective marker or a part of respective marker.

14. The method according to claim 13, wherein the second set of representations is matched to the first set of representations depending on the classifications of the first set of representations and the second set of representations.

15. A method comprising:

a) forming a plurality of discrete entities in a liquid, the discrete entities containing biological samples and comprising markers;

b) generating at least one set of representations of the markers for each discrete entity of the plurality of discrete entities by optical read-out of at least a part of the plurality of discrete entities;

c) cultivating, treating, sample processing, staining, and/or storing the part of the plurality of discrete entities under at least one predefined condition;

d) generating further sets of representations of the markers for at least a part of the discrete entities being cultivated or stored by further optical read-outs after a predefined time period;

e) comparing the set of representations to the further set of representations in order to recognize each discrete entity according to the method of claim 1; and f) depending on an outcome of step e), either repeating step c) or conveying discrete entities being selected according to at least one predefined criterium to an analysis step or to a further processing step.

16. A device for optically recognizing at least one target discrete entity from a plurality of discrete entities in a liquid, each discrete entity comprising a biological sample and a marker, the device comprising:

an imaging container configured to contain at least one discrete entity of the plurality of discrete entities, a detector and optical components for imaging at least partially the at least one discrete entity onto the detector, and a control unit configured to:

acquire a first optical read-out of the marker of a first discrete entity from the plurality of discrete entities, the first discrete entity defining the target discrete entity, generate a first set of representations of the marker of the first discrete entity based on the first optical readout of the marker of the first discrete entity, and associate the first set of representations with the target discrete entity, acquire a second optical read-out of the marker of the at least one discrete entity from the plurality of discrete entities, generate a second set of representations of the marker based on the second optical read-out of the marker of the at least one discrete entity, compare the second set of representations to the first set of representations, wherein each of the first set of representations and the second set of representations comprises a set of representations of the marker with progressively more information content, and wherein the comparing the second set of representations to the first set of representations comprises stepwise comparisons of equivalent representations of the first set and the second set to progressively more information content, and recognize the at least one discrete entity of the second optical read-out as the target discrete entity, upon determining that, at certain level of information content, a similarity measure between the second set of representations and the first set of representations exceeds a minimum level of statistical confidence.

17. A non-transitory computer-readable medium having program steps stored thereon, the program steps, when executed by a computer processor, causing performance of a method for optically recognizing at least one target discrete entity from a plurality of discrete entities in a liquid, each discrete entity comprising a biological sample and a marker, the method comprising:

acquiring a first optical read-out of the marker of a first discrete entity from the plurality of discrete entities, the first discrete entity defining the target discrete entity, generating a first set of representations of the marker of the first discrete entity based on the first optical read-out of the marker of the first discrete entity and associating the first set of representations with the target discrete entity, acquiring a second optical read-out of the marker of at least one discrete entity from the plurality of discrete entities, generating a second set of representations of the marker of the at least one discrete entity based on the second optical read-out of the marker of the at least one discrete entity, comparing the second set of representations to the first set of representations, wherein each of the first set of representations and the second set of representations comprises a set of representations of the marker with progressively more information content, and wherein the comparing the second set of representations to the first set of representations comprises stepwise comparisons of equivalent representations of the first set and the second set to progressively more information content, and recognizing the at least one discrete entity of the second optical read-out as the target discrete entity, upon determining that, at certain level of information content, a similarity measure between the second set of representations and the first set of representations exceeds a minimum level of statistical confidence.

* * * * *